US009550871B2

(12) United States Patent
Gong et al.

(10) Patent No.: US 9,550,871 B2
(45) Date of Patent: Jan. 24, 2017

(54) SUSTAINABLE HYBRID ORGANIC AEROGELS AND METHODS AND USES THEREOF

(71) Applicants: Wisconsin Alumni Research Foundation, Madison, WI (US); The United States of America as Represented by the Secretary of Agriculture, Washington, DC (US)

(72) Inventors: Shaoqin Gong, Middleton, WI (US); Alireza Javadi, Santa Clara, CA (US); Qifeng Zheng, Madison, WI (US); Zhiyong Cai, Madison, WI (US); Ronald Sabo, Sun Prairie, WI (US)

(73) Assignees: WISCONSIN ALUMNI RESEARCH FOUNDATION, Madison, WI (US); THE UNITED STATES OF AMERICA AS REPRESENTED BY THE SECRETARY OF AGRICULTURE, Washington, DC (US)

( * ) Notice: Subject to any disclaimer, the term of this patent is extended or adjusted under 35 U.S.C. 154(b) by 117 days.

(21) Appl. No.: 14/077,103

(22) Filed: Nov. 11, 2013

(65) Prior Publication Data
US 2014/0134415 A1    May 15, 2014

Related U.S. Application Data

(60) Provisional application No. 61/724,627, filed on Nov. 9, 2012, provisional application No. 61/825,405, filed on May 20, 2013.

(51) Int. Cl.
B32B 7/02 (2006.01)
A61F 13/15 (2006.01)
(Continued)

(52) U.S. Cl.
CPC ............... *C08J 9/28* (2013.01); *C08J 9/0076* (2013.01); *C08J 2201/0484* (2013.01); *C08J 2205/026* (2013.01); *C08J 2300/14* (2013.01)

(58) Field of Classification Search
CPC ..... C08J 9/0076; C08J 9/28; C08J 2201/0484; C08J 2205/026; C08J 2300/14; Y10T 428/1348; Y10T 428/1376; Y10T 428/249953
(Continued)

(56) References Cited

U.S. PATENT DOCUMENTS

2007/0259169 A1* 11/2007 Williams ............... C08J 5/04
428/312.6
2010/0144904 A1* 6/2010 Wang ................... B82Y 30/00
516/98
(Continued)

OTHER PUBLICATIONS

Schiraldi et al. ("The Effect of Molecular Weight on Poly(vinyl alcohol)/Clay Aerogel Composite properties" Polymer Preprints, 2007, 48, 974).*
(Continued)

Primary Examiner — Maria Veronica Ewald
Assistant Examiner — Travis Figg
(74) Attorney, Agent, or Firm — Foley & Lardner LLP

(57) ABSTRACT

Highly porous, lightweight, and sustainable hybrid organic aerogels with ultra-low densities and excellent material properties and methods for preparing them are provided, including, e.g., PVA/CNF/GONS, RF/CNF/GONS, and PVA/CNF/MWCNT. The aerogels are modified to have a super-hydrophobic surface, thus leading to an extremely low swelling ratio and rate of moisture absorption.

25 Claims, 17 Drawing Sheets

(51) Int. Cl.
B32B 27/32 (2006.01)
C08J 9/28 (2006.01)
C08J 9/00 (2006.01)

(58) Field of Classification Search
USPC .................................................. 428/212–220
See application file for complete search history.

(56) References Cited

U.S. PATENT DOCUMENTS

2011/0224376 A1* 9/2011 Zhai et al. ..................... 525/186
2012/0088857 A1* 4/2012 Gawryla .............. B01J 13/0091
521/141

OTHER PUBLICATIONS

Wang et al. ("Enhancing Mechanical Properties of Poly(vinyl alcohol) Blown Films by Drawing and Surface Crosslinking" J. App. Polymer Sci., 2005, 98, 774-779 ).*
Atieh et al. ("Modification and Functionalization of Multiwalled Carbon Nanotube (MWCNT) via Fischer Esterification" The Arabian Journal for Science and Engineering, 2010, 35, 37-48).*
Lindstrom et al. ("Aerogels from nanofibrillated cellulose with tunable oleophobicity" Soft Matter, 2010, 6, 3298-3305).*
Vu et al. ("Organic Aerogels with Very High Impact Strength" Adv. Mater. 2001, 13, p. 644-646).*
Edgren et al. ("Crosslinking reaction of poly(vinyl alcohol) with glyoxal" J. Polym. Res. 2010, 17, p. 725-730).*
Gao, Kezheng et al., "Cellulose nanofiber-graphene all solid-state flexible supercapacitorst", J. Mater. Chem. A, (2013), 1, pp. 63-67.
Aaltonen, O., et al., "The preparation of lignocellulosic aerogels from ionic liquid solutions," Jan. 2009, Carbohydrate Polymers, vol. 75, Issue 1, pp. 125-129.
Adsul, M., et al., "Combined strategy for the dispersion/dissolution of single walled carbon nanotubes and cellulose in water," 2011, J. Mater. Chem., vol. 21, pp. 2054-2056.
Ajayan, P.M., "Nanotubes from Carbon," Jul. 1999, Chem. Rev., vol. 99, No. 7, pp. 1787-1800.
Arndt, E., et al., "Elastic, low density epoxy/clay aerogel composites," 2007, J. Mater. Chem., vol. 17, pp. 3525-3529.
Aulin, C., et al., "Aerogels from nanofibrillated cellulose with tunable oleophobicity," 2010, Soft Matter, vol. 6, Issue 14, pp. 3298-3305.
Biener, J., et al., "Advanced carbon aerogels for energy applications," 2011 Energy Environ. Sci., vol. 4, Issue 3, pp. 656-667.
Boday, D., et al., "Strong, low-density nanocomposites by chemical vapor deposition and polymerization of cyanoacrylates on aminated silica aerogels," Jul. 2009, ACS Appl. Mater. Interfaces, vol. 1, Issue 7, pp. 1364-1369.
Cai, J., et al., "Cellulose Aerogels from Aqueous Alkali Hydroxide-Urea Solution," Feb. 2008, ChemSusChem, vol. 1, Issue 1-2, pp. 149-154.
Cai, J., et al., "Cellulose-Silica Nanocomposite Aerogels by In-Situ Formation of Silica in Cellulose Gel," Feb. 2012 vol. 51, Issue 9, pp. 2076-2079.
Carlsson, D., et al., "Electroactive nanofibrillated cellulose aerogel composites with tunable structural and electrochemical properties," 2012, J. Mater. Chem., vol. 22, pp. 19014-19024.
Chen, W., et al., "Ultralight and highly flexible aerogels with long cellulose I nanofibers," Jun. 2011, Soft Matter, vol. 7, Issue 21, pp. 10360-10368.
Coleman, J., et al., "Mechanical Reinforcement of Polymers Using Carbon Nanotubes," Mar. 2006, Adv. Mater., vol. 18, Issue 6, pp. 689-706.
Endo, R., et al., "TEMPO-oxidized cellulose nanofibril/poly(vinyl alcohol) composite drawn fibers," Jan. 2013, Polymer, vol. 54, Issue 2, pp. 935-941.
Fischer, F., et al., "Cellulose-based aerogels," Oct. 2006, Polymer, vol. 47, Issue 22, pp. 7636-7645.

Frackowiak, E., et al., "Carbon materials for the electrochemical storage of energy in capacitors," 2001, Carbon 39, pp. 937-950.
Fricke, J., et al., "Aerogels: production, characterization, and applications," Apr. 1997, Thin Film Solids, vol. 297, Issue 1-2, pp. 212-223.
Fricke, J., et al., "SiO2-aerogels: Modifications and applications," May 1990, J. Non-Cryst Solids, vol. 121, Issue 1-3, pp. 188-192.
Garcia-Gonzalez, C.A., et al., "Polysaccharide-based aerogels-Promising biodegradable carriers for drug delivery systems," Oct. 2011, Carbohydrate Polymers, vol. 86, Issue 4, pp. 1425-1438.
Gawryla, M., et al., "Clay aerogel/cellulose whisker nanocomposites: a nanoscale wattle and daub," 2009, J. Mater. Chem., vol. 19, pp. 2118-2124.
Gawryla, M., et al., "pH Tailoring Electrical and Mechanical Behavior of Polymer-Clay-Nanotube Aerogels," Oct. 2009, Macromol. Rapid. Commun., vol. 30, Issue 19, pp. 16669-16673.
Gesser et al., "Aerogels and related porous materials," Chem. Rev., 1989, vol. 89, No. 4, pp. 765-788.
Gross, J., et al., "Sound Propagation in SiO2 Aerogels," 1992, J. Acoust. Soc. Am., vol. 91, Issue 4, pp. 2004.
Henriksson, M., et al., "An environmentally friendly method for enzyme-assisted preparation of microfibrillated cellulose (MFC) nanofibers," 2007, Euro Polym J, vol. 43, pp. 3434-3441.
Hou, Y., et al., "Functionalized Few-Walled Carbon Nanotubes for Mechanical Reinforcement of Polymeric Composites," 2009, ACS Nano, vol. 3, Issue 5, pp. 1057-1062.
Hrubesh, et al., "Thermal properties of organic and inorganic aerogels," Journal of Materials Research, 1994, vol. 9, No. 3, pp. 731-738.
Husing, N., et al., "Aerogels-Airy Materials: Chemistry, Structure and Properties," Feb, 2, 1998, Angew. Chem., vol. 37, Issue 1-2, pp. 22-45.
Jin, H., et al., "Nanofibrillar cellulose aerogels," Jun. 2004, Colloids and Surfaces A: Physicochemical and Engineering Aspects, vol. 240, Issue 1-3, pp. 63-67.
Klemm, D., et al., "Cellulose: fascinating biopolymer and sustainable raw material," 2005, Angew Chem. Int. Ed., vol. 44, pp. 3358-3393.
Klemm, D., et al., "Nanocelluloses: A New Family of Nature-Based Materials," Jun. 2011, Angew. Chem. Int. Ed., vol. 50, Issue 24, p. 5438-5466.
Koga, H., et al., "Transparent, Conductive, and Printable Composites Consisting of TEMPO-Oxidized Nanocellulose and Carbon Nanotube," Feb. 2013, Biomacromolecules, vol. 14, Issue 4, pp. 1160-1165.
Kucheyev, S., et al., "Nanoengineering Mechanically Robust Aerogels via Control of Foam Morphology," 2006, Appl. Phys. Lett. 89, 041911, 4 pages.
Mehling, T., et al., "Polysaccharide-based aerogels as drug carriers," Dec. 2009, Journal of Non-Crystalline Solids, vol. 355, Issue 50-51, p. 2472-2479.
Moon, R., "Cellulose nanomaterials review: structure, properties and nanocomposites," 2011, Chem. Soc. Rev., vol. 40, Issue 7, pp. 3941-3994.
Moreno-Castilla, C., et al., "Carbon Aerogels for Catalysis Applications: An Overview," 2005, Carbon, vol. 43, Issue 3, pp. 455-465.
Morris, C., et al., "Silica sol as a nanoglue: flexible synthesis of composite aerogels," 1999, Science, vol. 284, Issue 5414, pp. 622-624.
Paakko, M., et al., "Enzymatic hydrolysis combined with mechanical shearing and high-pressure homogenization for nanoscale cellulose fibrils and strong gels," Jun. 2007, Biomacromolecules, vol. 8, Issue 6, pp. 1934-1941.
Paakko, M., et al., "Long and entangled native cellulose I nanofibers allow flexible aerogels and hierarchically porous templates for functionalities," 2008, Soft Matter, vol. 4, Issue 12, pp. 2492-24993.
Pekala, R., et al., "Organic aerogels: microstructural dependence of mechanical properties in compression," Nov. 1990, J. Non-Cryst. Solids, vol. 125, No. 1-2, pp. 67-75.
Pierre, A., et al., "Chemistry of Aerogels and Their Applications," 2002, Chem. Rev., vol. 102, pp. 4243-4265.

(56) References Cited

OTHER PUBLICATIONS

Randall, J.P., et al., "Tailoring Mechanical Properties of Aerogels for Aerospace Applications," Mar. 2011, ACS Appl. Mater. Interfaces, vol. 3, Issue 3, pp. 613-626.
Raymundo-Pinero, E., et al., "High Surface Area Carbon Nanotubes Prepared by Chemical Activation," 2002, Carbon, vol. 40, No. 9, pp. 1597-1617.
Saito, T., et al., "Cellulose nanofibers prepared by TEMPO-mediated oxidation of native cellulose," Aug. 2007, Biomacromolecules, vol. 8, Issue 8, pp. 2485-2491.
Saito, T., et al., "Individualization of nano-sized plant cellulose fibrils by direct surface carboxylation using TEMPO catalyst under neutral conditions," Jul. 2009, Biomacromolecules, vol. 10, Issue 7, pp. 1992-1996.
Scheuerpflug, P., et al., "Apparent thermal conductivity of evacuated $SiO_2$-aerogel tiles under variation of radiative boundary conditions," Dec. 1985, J. Heat Mass Tran., vol. 28, Issue 12, pp. 2299-2306.
Sehaqui, H., et al., "Mechanical performance tailoring of tough ultra-high porosity foams prepared from cellulose I nanofiber suspensions," 2010, Soft Matter, vol. 6, Issue 8, pp. 1824-1832.
Sehaqui, H., et al., "High-porosity aerogels of high specific surface area prepared from nanofibrillated cellulose (NFC)," 2011, Compos. Sci. Technol., vol. 71, pp. 1593-1599.
Srithep, Y., et al., "Nanofibrillated cellulose (NFC) reinforced polyvinyl alcohol (PVOH) nanocomposites: properties, solubility of carbon dioxide, and foaming," Aug. 2012, Cellulose, vol. 19, Issue 4, pp. 1209-1223.
Tamon, H., et al., "Influence of freeze-drying conditions on the mesoporosity of organic gels as carbon precursors," 2000, Carbon, vol. 38, Issue 7, pp. 1099-1105.
Tan, C., et al., "Organic Aerogels with Very High Impact Strength," Advanced Materials, May 2001, vol. 13, No. 9, pp. 644-646.
Terki, F., et al., "Elastic properties of xerogels and sintered aerogels probed by inelastic light scattering," Apr. 1998, J. Non-Cryst. Solids, vol. 225, pp. 277-281.
Tischer, P., et al., "Nanostructural Reorganization of Bacterial Cellulose by Ultrasonic Treatment," Apr. 2010, Biomacromolecules, vol. 11, Issue 5, pp. 1217-1224.
Wagberg, L., et al., "The build-up of polyelectrolyte multilayers of microfibrillated cellulose and cationic polyelectrolytes," 2008, Langmuir, vol. 24, Issue 3, pp. 784-795.
Worsley, M., et al., "Mechanically robust and electrically conductive carbon nanotube foams," 2009, Appl. Phys. Lett., vol. 94, 073115, 4 pages.
Yang, D., et al., "Thermal conductivity of multiwalled carbon nanotubes," 2002, Phys. Rev. B, vol. 66, Issue 16, 6 pages.
Zhan, G., et al., "Single-Wall Carbon Nanotubes as Attractive Toughening Agents in Alumina-Based Nanocomposites," 2003, Nature Materials, vol. 2, pp. 38-42.
Zhang, W., et al., "Aerogels from crosslinked cellulose nano/microfibrils and their fast shape recovery property in water," 2012, J. Mater. Chem., vol. 22, pp. 11642-11650.

\* cited by examiner

SUSTAINABLE HYBRID ORGANIC AEROGELS AND METHODS AND USES THEREOF

STATEMENT OF GOVERNMENT RIGHTS

This invention was made with government support under 11-JV-11111127-098 awarded by the USDA/FS. The government has certain rights in the invention.

TECHNICAL FIELD

The present technology relates generally to the field of aerogel compositions and to various methods for producing the aerogel compositions. In addition, the present technology pertains to applications of the aerogel compositions and devices which utilize the new aerogels.

BACKGROUND

The following description is provided to assist the understanding of the reader. None of the information provided or references cited is admitted to be prior art to the present technology.

Aerogels are lightweight materials that have drawn significant attention due to their combination of unique properties including a high porosity (typically 95%-99%), low density (typically less than 400 kg/m$^3$), high specific surface area, excellent thermal, acoustic, and electrical conductivities, and low dielectric constant. Over the past 70 years, researchers have mostly focused on developing inorganic aerogels such as silica, clay, and metal oxide aerogels. For instance, NASA has developed a series of silica-based inorganic aerogels for various space applications such as launch vehicles, space shuttle upgrades, interplanetary propulsion, space suits, and life support equipment. Various types of inorganic-based aerogels have also been developed and commercialized for applications in the structural insulation, clothing, aviation, automotive, and aerospace industries. However, inorganic (mainly silica) aerogels often suffer from intrinsic brittleness and a relatively high density (100-400 kg/m$^3$), which consequently limits their use in applications where tough, strong, and low-density materials are required.

SUMMARY

The present technology provides hybrid organic aerogels having low densities and excellent mechanical properties suitable for a wide array of applications. The present hydrogels include a water-soluble organic polymer, cellulose nanofibrils and/or nanocrystals, and carbon nanotubes or water-soluble graphene oxide. The water-soluble polymer and optionally cellulose nanofibrils and/or nanocrystals may be cross-linked such that they are no longer water-soluble. These aerogels are highly porous with large surface to volume ratios and great specific compressive strength.

The present technology further provides methods of making the hybrid organic aerogels and articles incorporating such aerogels such as various types of insulation and insulators.

The foregoing summary is illustrative only and is not intended to be in any way limiting. In addition to the illustrative aspects, embodiments and features described above, further aspects, embodiments and features will become apparent by reference to the following drawings and the detailed description.

DETAILED DESCRIPTION

Figure 1:
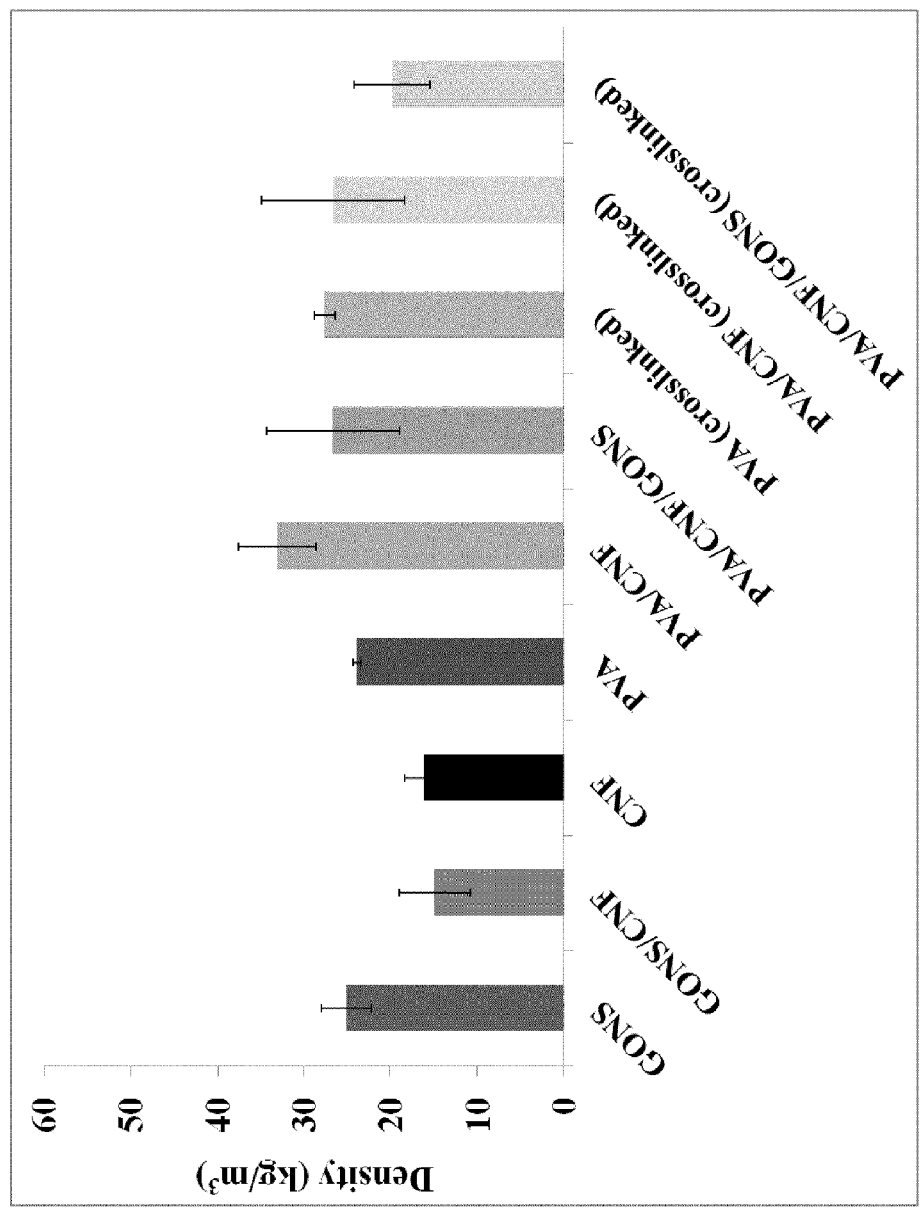
FIG. 1 is a bar graph of the densities of illustrative embodiments of aerogels made from various formulations, including one or more of cellulose nanofibrils, graphene oxide, and polyvinyl alcohol. The aerogels are either cross-linked (as indicated) or non-crosslinked.

In the following detailed description, reference is made to the accompanying drawings, which form a part hereof. In the drawings, similar symbols typically identify similar components unless context dictates otherwise. The illustrative embodiments described in the detailed description, drawings, and claims are not meant to be limiting. Other embodiments may be utilized, and other changes may be made, without departing from the spirit or scope of the subject matter presented here.

The technology is described herein using several definitions, as set forth throughout the specification.

For the purposes of this disclosure and unless otherwise specified, "a" or "an" means "one or more."

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The embodiments, illustratively described herein, may suitably be practiced in the absence of any element or elements, limitation or limitations, not specifically disclosed herein. Thus, for example, the terms "comprising," "including," "containing," etc., shall be read expansively and without limitation. Additionally, the terms and expressions employed herein have been used as terms of description and not of limitation, and there is no intention in the use of such terms and expressions of excluding any equivalents of the features shown and described, or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specifically specified.

As used herein, the term "and/or" shall also be interpreted to be inclusive in that the term shall mean both "and" and "or." In situations where "and/or" or "or" are used as a conjunction for a group of three or more items, the group should be interpreted to include one item alone, all of the items together, or any combination or number of the items.

One aspect of the present technology provides an aerogel which includes a water-soluble organic polymer, cellulose nanofibrils and/or nanocrystals, and water-soluble graphene oxide. In one embodiment, the water-soluble polymer and optionally the cellulose nanofibrils are cross-linked such that they are no longer water-soluble.

Any suitable water-soluble organic polymer may be used in the present aerogel compositions. As used herein, the term "water-soluble organic polymer" means an organic polymer having a solubility in water of at least 1 mg/ml at 25° C. or an organic polymer comprising at least 90 mol % organic monomers that have a water solubility of at least 1 mg/ml at 25° C. In some embodiments the water-soluble organic polymer has a solubility of at least 5 mg/ml, at least 10 mg/ml, at least 25 mg/ml, at least 50 mg/ml, at least 75 mg/ml, at least 100 mg/ml or at least 150 mg/ml in water at 25° C. In some embodiments, the water-soluble organic polymer has a solubility greater than or equal to 100 mg/ml. In some embodiments, the water-soluble organic monomers of the water-soluble organic polymer have a solubility of at least 5 mg/ml, at least 10 mg/ml, at least 25 mg/ml, at least 50 mg/ml, at least 75 mg/ml, at least 100 mg/ml or at least 150 mg/ml in water at 25° C.

In some embodiments, the water-soluble organic polymer is a thermoplastic polymer. Suitable water-soluble polymers include, for example, polyvinyl alcohol, polyethylene glycol, polyacrylamide, polyacrylic acid, polymethacrylic acid, cellulose, hydroxypropylmethyl cellulose, hydroxypropyl cellulose, chitosan, dextran, and dextran sulfate, or a combination of any two or more thereof. In some embodiments, the water-soluble organic polymer is polyvinyl alcohol, polyethylene glycol, polyacrylamide, polyacrylic acid, polymethacrylic acid, or a combination of any two or more thereof. In some embodiments, the water-soluble polymer is polyvinyl alcohol (PVA).

In some embodiments, the water-soluble organic polymer is a thermoset polymer which comprises at least 90 mol % water-soluble organic monomers (e.g., having a water solubility of at least 1 mg/ml at 25° C. In some embodiments, the thermoset polymer comprises at least 90 mol %, at least 95 mol % or 100 mol % water-soluble monomers. However, it will be understood by those skilled in the art that the thermoset organic polymer of the present technology is an organic polymer cross-linked/cured at least to the extent that it cannot be significantly softened or remelted by heat and is no longer water-soluble, despite including water-soluble organic monomers. Suitable thermoset polymers include, for example, polymerized resorcinol-formaldehyde, phenol-formaldehyde, urea-formaldehyde, polyamic acid salt or a combination of any two or more thereof. In some embodiments, the water-soluble monomers are resorcinol and formaldehyde which form resorcinol-formaldehyde thermosetting polymer. In some embodiments, the thermoset organic polymer is cross-linked with sodium borate, boric acid, organic dialdehyde, or a combination of any two or more thereof.

The water-soluble organic polymers of the present technology may have a molecular weight from about 500 to about 200,000 Daltons (Da). In some embodiments, the water-soluble organic polymer has a molecular weight of greater than 1,000 or greater than 10,000 Da. In another embodiment, the water-soluble organic polymer has a molecular weight of about 1,000 Da to about 150,000 Da, about 10,000 to about 125,000, about 15,000 Da to 100,000 Da, about 20,000 Da to about 50,000 Da, or about 25,000 Da to about 35,000 Da. In some embodiments the water-soluble organic polymer has a molecular weight of about 10,000 Da, about 12,500 Da, about 25,000 Da, about 50,000 Da, about 100,000 Da, about 125,000 Da, about 150,000 Da, about 200,000 Da, or a range between and including any two of these values.

A wide variety of cellulose nanofibrils and nanocrystals (CNFs) may be used in the present technology such as those prepared and/or characterized in Saito et al. (*Biomacromolecules* 2006, 7, 1687-4691); Pääkkö et al. (*Biomacromolecules,* 2007, 1934-1941); Zimmermann et al. (*Carbohydrate Polymers,* 2010, 79, 1086-1093); Postek et al. (*Measurement Science and Technology,* 2011, 024005); Zhu et al. (*Green Chemistry,* 2011, 13, 1339-1344; Pääkkö et al. (*Soft Matter,* 2008, 4, 2492-2499), Henriksson et el. (*European Polymer Journal,* 2007, 43, 3434-3441), the disclosures of which are hereby incorporated by reference and for all purposes. The cellulose nanofibrils or nanocrystals may have suitable average diameters in the range of about 1 to about 100 nanometers (nm). In some embodiments, the cellulose nanofibrils or nanocrystals are characterized as having average diameters in the range of about 2 nm to about 50 nm. In various embodiments, cellulose nanofibrils or nanocrystals may have average diameters in the range of about 0.01 nm to less than 1000 nm, about 1 nm to about 100 nm, about 2 nm to about 50 nm, about 5 nm to about 45 nm, about 10 nm to about 40 nm, or about 20 nm to about 30 nm. Examples of average diameters of cellulose nanofibrils and nanocrystals include about 1 nm, about 5 nm, about 10 nm, about 20 nm, about 30 nm, about 40 nm, about 50 nm, about 60 nm, about 70 nm, about 80 nm, about 90 nm, about 100 nm, about 200 nm, about 300 nm, about 400 nm, about 500 nm, and ranges between and including any two of these values. In some embodiments, the cellulose nanofibrils or nanocrystals is/has a diameter of 5 to 30 nm.

The length of the cellulose nanofibrils or nanocrystals can be optimized depending on the desired characteristics of the aerogel. In some embodiments, the cellulose nanofibrils and/or nanocrystals have an average length of 10 nm to several micrometers (μm), e.g., 8 μm. In some embodiments, the cellulose nanofibrils or nanocrystals are characterized as having average lengths of about 10 nm, about 20 nm, about 30 nm, about 40 nm, about 50 nm, about 75 nm, about 100 nm, about 200 nm, about 300 nm, about 400 nm, about 500 nm, about 600 nm, about 700 nm, about 800 nm, about 900 nm, about 1000 nm, about 1500 nm, about 2000 nm, about 2500 nm, about 3000 nm, about 4000 nm, about 5000 nm, about 6000 nm, about 7000 nm, about 8000 nm, and ranges between and including any two of these values.

The graphene oxides which serve as the second nanofiller in this hybrid organic aerogel system are water-soluble, i.e. they have a solubility in water of at least 1 mg/ml at 25° C. The water-soluble graphene oxides have excellent mechanical properties, large surface-to-volume ratios, and a large amount of oxygen atoms on their surface, thus enabling the formation of strong hydrogen bonding among the three components—e.g., water-soluble organic polymer, CNF, and water-soluble graphene oxide such as graphene oxide nanosheets (GONs).

Thus, in one aspect, the present technology provides hybrid organic aerogels that include a CNF in combination with a water-soluble thermoplastic polymer (i.e., polyvinyl alcohol (PVA) and graphene oxide nanosheets (GONSs) (abbreviated as PVA/CNF/GONS)).

In another aspect, the present technology provides hybrid aerogels that include a water-soluble organic polymer, cellulose nanofibrils and/or nanocrystals, and carbon nanotubes (CNTs) (e.g., hydroxylated multiwalled carbon nanotubes). The water-soluble polymer may be cross-linked (optionally with the cellulose nanofibrils and/or nanocrystals) such that it is no longer water-soluble. The surface of the aerogels may be modified/functionalized as described herein. These aerogels are highly porous with large surface to volume ratios and great specific compressive strength. In some embodiments the water-soluble polymers may be any of those described above. In other embodiments the, cellulose nanofibrils or nanocrystals may be any of those described above.

A variety of carbon nanotubes may be used in the present hybrid aerogels. Carbon nanotubes are tubes or tube-like structures comprised primarily of carbon atoms. However, they may contain other elements, e.g., metals, and may be surface modified to have better aqueous dispersability, e.g., with hydroxyl, carboxyl or other suitable groups. Both single-walled carbon nanotubes (SWCNTs) and multi-walled carbon nanotubes (MWCNT) may be used in the present technology. SWCNTs essentially are single cylinders, whereas MWCNTs, for example, may include several concentric nanotubes each having a different diameter. Thus, the smallest diameter tube is encapsulated by a larger diameter tube, which in turn, is encapsulated by another larger diameter nanotube. Alternatively, a MWCNT may be composed of a single sheet of graphene rolled about itself to form a number of layers. Carbon nanotubes as used herein are generally about 0.5 to about 200 nm in diameter. Examples of suitable diameters include about 0.5, about 1, about 2, about 3, about 4, about 5, about 10, about 15, about 20, about 25, about 50, about 100, about 150, or about 200 nm or a range between and including any two of the foregoing values. Typically, the ratio of the length dimension to the diameter of the carbon nanotubes, i.e., the aspect ratio, is at least 10. In general, the aspect ratio is between about 10 and about 100,000. Examples of aspect ratios include about 10, about 100, about 1000, about 10,000, about 100,000, or any range between and including any two of the foregoing values.

CNTs may be produced by a variety of methods, and additionally are commercially available. Methods of CNT synthesis include laser vaporization of graphite target (A. Thess et al. Science 273, 483 (1996)), arc discharge (C. Journet et al., Nature 388, 756 (1997)) and HiPCo (high pressure carbon monoxide) process (P. Nikolaev et al. Chem. Phys. Lett. 313, 91-97 (1999)). Chemical vapor deposition (CVD) can also be used in producing carbon nanotubes (J. Kong et al. Chem. Phys. Lett. 292, 567-574 (1998). Additionally CNTs may be grown via catalytic processes both in solution and on solid substrates (Nan Li, et al., Chem. Mater.; 2001; 13(3); 1008-1014); (N. Franklin and H. Dai Adv. Mater. 12, 890 (2000); A. Cassell et al. J. Am. Chem. Soc. 121, 7975-7976 (1999)). Standard methods of surface modification to hydroxylate or attach other functional groups to the CNTs are known in the art.

In certain embodiments the aerogels include polyvinyl alcohol (PVA), cellulose nanofibrils (CNF), and MWCNT (e.g., hydroxyl-functionalized MWCNTs). These hybrid organic aerogels were prepared using an environmentally friendly freeze-drying process with renewable materials. The material properties of these "green" hybrid aerogels were characterized extensively using various techniques.

The resulting hybrid aerogels show drastically increased mechanical properties compared to the PVA aerogels alone. The mechanical properties of the hybrid aerogels showed an exponential dependency on the relative aerogel densities. These low-density hybrid aerogels also exhibited very low thermal conductivities and high surface areas, thereby making them useful for many applications including thermal insulation and structural components.

Hybrid aerogels that include a water-soluble organic polymer, cellulose nanofibrils and/or nanocrystals, and MWCNT are ultralight, and mechanically robust. Such aerogels may be fabricated using an environmentally friendly freeze-drying method. In some embodiments, the PVA, CNFs, and hydroxyl-functionalized MWCNTs were chemically crosslinked together via the hydroxyl groups present on these components using glutaraldehyde. The mechanical properties of these PVA/CNF/MWCNT hybrid aerogels were superior to those reported in the literature for clay/cellulose aerogels, epoxy/clay aerogels, polymer/clay/nanotubes aerogels, and polymer/silica aerogels at comparable densities. Moreover, the mechanical properties demonstrated a strong exponential relationship with the relative aerogel densities, thereby making it possible to fabricate aerogels with a wide range of mechanical properties by adjusting the relative aerogel densities.

The present aerogels may further include a surface modifier. In some embodiments, the surface modifier is a silane compound (but not $SiH_4$ itself), such as an organosilane or haloorganosilane. Suitable surface modifiers include, for example, trialkylsilane, a dialkylarylsilane, an alkyldiarylsilane, a triarylsilane, a trichlorosilane, or a combination of any two or more thereof. In some embodiments, the silane is halogenated with 1 or more halogen atoms (e.g., F, Cl, Br, I) attached to the silicon and/or attached to any hydrocarbon groups that are attached to the silicon. For example, the silane compound may be fluorinated and includes, e.g., 1 or more fluorine atoms, e.g., 1, 2, 3, 4, 5, 6, 7, 8, 9, 10, 11, 12, 13, 14, 15, 16, 17, 18, 19, or 20 fluorines or any number of fluorines between and/or including any two of the preceding values. By way of non-limiting example, the silane may be tridecafluoro-1,1,2,2,-tetrahydrooctyl trichlorosilane, 4-(trifluoromethyl-tetrafluorophenyl)-triethoxysilane, trialkoxy silanes, and/or trichlorosilanes with various substituents in place of the hydrogen. Substituents may be selected from alkyl, haloalkyl, alkoxy, amino, aminoalkyl, alkylamino, and (meth)acrylic groups, among others.

The aerogel compositions of the present technology have remarkable specific compressive strength while maintaining low density. For example, in various embodiments, the aerogel compositions have a specific compressive strength in the range of about 0.0001 $MPa \cdot kg^{-1} \cdot m^3$ to about 1.0 $MPa \cdot kg^{-1} \cdot m^3$, about 0.0005 $MPa \cdot kg^{-1} \cdot m^3$ to about 0.1 $MPa \cdot kg^{-1} \cdot m^3$, about 0.001 $kg/m^3$ to about 0.005 $kg/m^3$, or about 0.008 $kg/m^3$ to about 0.01 $kg/m^3$. In some embodiments, the aerogel compositions have a specific compressive strength ranging from about 0.0005 $MPa \cdot kg^{-1} \cdot m^3$ to about 0.1 $MPa \cdot kg^{-1} \cdot m^3$. Similarly, in various embodiments, the aerogel compositions have a compressive modulus in the range of about 50 kPa to about 500 kPa. Examples of compressive modulus include about 50 kPa, about 75 kPa, about 100 kPa, about 150 kPa, about 175 kPa, about 200 kPa, about 225 kPa, about 250 kPa, about 275 kPa, about 300 kPa, about 325 kPa, about 350 kPa, about 375 kPa, about 400 kPa, about 425 kPa, about 450 kPa, about 500 kPa, or a range between and including any two of the foregoing values. In some embodiments, the aerogel compositions have a compressive strength ranging from about 275 kPa to about 325 kPa.

The present aerogel compositions typically have a density of not more than about 250 $kg/m^3$, and more typically not more than about 100 $kg/m^3$. In various embodiments, the aerogel compositions have a density in the range of about 5 $kg/m^3$ to about 250 $kg/m^3$, about 10 $kg/m^3$ to about 200 $kg/m^3$, about 10 $kg/m^3$ to about 180 $kg/m^3$, or about 10 $kg/m^3$ to about 150 $kg/m^3$. Examples of densities of the aerogel compositions include about 5 $kg/m^3$, about 10 $kg/m^3$, about 15 $kg/m^3$, about 20 $kg/m^3$, about 30 $kg/m^3$, about 40 $kg/m^3$, about 50 $kg/m^3$, about 60 $kg/m^3$, about 70 $kg/m^3$, about 80 $kg/m^3$, about 90 $kg/m^3$, about 100 $kg/m^3$, about 110 $kg/m^3$, about 120 $kg/m^3$, about 130 $kg/m^3$, about 140 $kg/m^3$, about 150 $kg/m^3$, about 160 $kg/m^3$, about 170 $kg/m^3$, about 180 $kg/m^3$, about 190 $kg/m^3$, about 200 $kg/m^3$, about 210 $kg/m^3$, about 220 $kg/m^3$, about 230 $kg/m^3$, about 240 $kg/m^3$, about 250 $kg/m^3$, and ranges between and including any two of these values. In some embodiments, the aerogel compositions have a density of about 10 $kg/m^3$ to about 60 $kg/m^3$.

In some embodiments, the aerogel compositions have a strain-at-failure of at least about 30%, at least about 40%, at least about 50%, at least about 55%, at least about 60%, at least about 65%, at least about 70%, at least about 75%, at least about 80%, at least about 85%, or at least about 90%. In certain embodiments, the aerogel compositions have a strain-at-failure of at least about 60%.

The aerogel compositions have high porosity, for example, of at least about 70%, at least about 75%, at least about 80%, at least about 85%, at least about 90%, at least about 95%, or at least about 99%. In certain embodiments, the aerogel compositions have a porosity of at least about 90%.

The present aerogel compositions have high surface areas, for example, about 50 $m^2 g^{-1}$ to about 500 $m^2 g^{-1}$. Examples of surface areas include about 50 $m^2 g^{-1}$, about 70 $m^2 g^{-1}$, about 90 $m^2 g^{-1}$ about 110 $m^2 g^{-1}$, about 130 $m^2 g^{-1}$, about 150 $m^2 g^{-1}$, about 170 $m^2 g^{-1}$, about 190 $m^2 g^{-1}$, about 210 $m^2 g^{-1}$, about 230 $m^2 g^{-1}$, about 250 $m^2 g^{-1}$, about 270 $m^2 g^{-1}$, about 290 $m^2 g^{-1}$, about 310 $m^2 g^{-1}$ about 330 $m^2 g^{-1}$, about 350 $m^2 g^{-1}$, about 370 $m^2 g^{-1}$, about 390 $m^2 g^{-1}$, about 410 $m^2 g^{-1}$, about 430 $m^2 g^{-1}$, about 450 $m^2 g^{-1}$, about 470 $m^2 g^{-1}$, about 490 $m^2 g^{-1}$, about 500 $m^2 g^{-1}$, and ranges between and including any two of these values. In certain embodiments, the hybrid aerogel compositions have a surface area of about 150 $m^2 g^{-1}$ to about 200 $m^2 g^{-1}$.

Aerogel compositions of the present technology have low thermal conductivity in comparison to their solid counterparts. For example, in various embodiments, the hybrid aerogel compositions have a thermal conductivity in the range of about 10 $mWm^{-1}K^{-1}$ to about 60 $mWm^{-1}K^{-1}$. Examples of thermal conductivities include about 5 $mWm^{-1}K^{-1}$, 10 $mWm^{-1}K^{-1}$, 20 $mWm^{-1}K^{-1}$, about 25 $mWm^{-1}K^{-1}$, about 30 $mWm^{-1}K^{-1}$, about 35 $mWm^{-1}K^{-1}$, about 40 $mWm^{-1}K^{-1}$, about 45 $mWm^{-1}K^{-1}$, about 50 $mWm^{-1}K^{-1}$, about 55 $mWm^{-1}K^{-1}$, about 60 $mWm^{-1}K^{-1}$ and ranges between and including any two of these values. In some embodiments, the hybrid aerogel compositions have a thermal conductivity ranging from about 25 $mWm^{-1}K^{-1}$ to about 35 $mWm^{-1}K^{-1}$.

In one aspect, the present technology provides methods for making the graphene oxide-containing aerogels disclosed herein. The methods include combining a water-soluble organic polymer, cellulose nanofibrils and/or nanocrystals, and a water-soluble graphene oxide in water; crosslinking the water-soluble organic polymer and optionally the cellulose nanofibrils and/or nanocrystals such that they are no longer water-soluble; and removing the water from the resulting gel to form an aerogel. Suitable water-soluble organic polymers and suitable graphene oxide materials useful in the present methods are discussed above. Similarly, there are provided methods for making the CNT-containing aerogels disclosed herein. The methods include combining a water-soluble organic polymer, cellulose nanofibrils and/or nanocrystals, and a CNT, such as, e.g., a MWCNT in water, cross-linking the mixture to form a gel; and removing the water from the gel to form an aerogel.

The water in the aerogel compositions prepared using the above methods can be removed by several methods known in the art. Examples of such methods include freeze drying, vacuum drying and supercritical drying and the like. In some embodiments, the water is removed by freeze-drying the gel to provide the aerogel. Freeze drying is inexpensive, easy, scalable, and capable of producing high-quality components in any desired geometry.

The aerogels of the present technology can be tuned for specific applications by modifying the compositions (e.g., the amount and type of materials used in the formulations), the processing conditions or other parameters. Furthermore, the aerogels can be tailored using a variety of known post-treatment methods, giving them a flexibility to be used in several applications such as those mentioned above.

For example, one method for tailoring properties of the present aerogels include surface-coating the aerogel with suitable materials to enhance, e.g., hydrophobicity. Thus, in one embodiment, the method further includes contacting a surface of the aerogel with a surface modifying agent to provide a surface-modified aerogel. Any suitable surface modifying agent known in the art may be used as a coating material. Examples of such surface modifying agents include silane compounds such as tridecafluoro-1,1,2,2,-tetrahydrooctyl trichlorosilane, 4-(trifluoromethyl-tetrafluorophenyl) triethoxysilane, trialkoxy silanes, and/or trichlorosilanes with various substituents (e.g., alkyl, amino, and (meth)acrylic), and combinations thereof. Two such surface modifying agents are illustrated below:

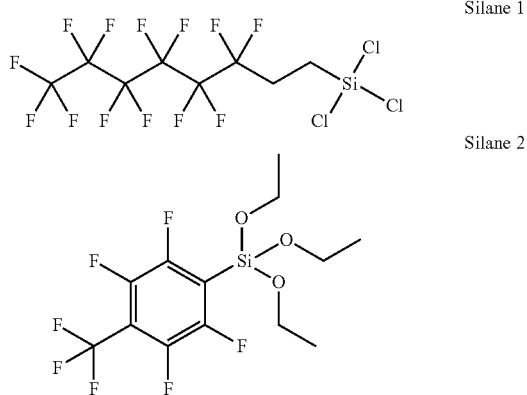

Silane 1

Silane 2

Silane 1 is tridecafluoro-1,1,2,2,-tetrahydrooctyl trichlorosilane and

Silane 2 is 4-(trifluoromethyl-tetrafluorophenyl) triethoxysilane.

These hybrid organic aerogels possess excellent properties such as enhanced robustness, improved deformability, high specific compressive strength, high compressive strain, ultra-low density, and low moisture absorption. Because of their excellent mechanical, thermal, and surface properties, these aerogels are potentially useful for a wide range of applications. For example, the aerogel compositions of the present technology may serve as excellent insulators. Thus, in one embodiment, the present technology provides an insulation composition which includes an aerogel disclosed above. In some embodiments, the insulation is thermal insulation, acoustic insulation or electrical insulation.

All references cited herein are specifically incorporated by reference in their entirety and for all purposes as if fully set forth herein.

The present technology is further illustrated by the following examples, which should not be construed as limiting in any way.

EXAMPLES

Example 1

Preparation of Cellulose Nanofibrillated Fibers (CNFs)

TEMPO-oxidized CNFs used in this study were prepared according to the work reported by Saito et al. (*Biomacromecules*, 2009, 10, 1992-1996). Briefly, bleached eucalyptus pulp fibers were carboxylated using 2,2,6,6-tetramethylpiperidine-1-oxyl (TEMPO), sodium chlorite, and sodium hypochlorite as the reactants at 60° C. for 48 hours. TEMPO oxidized pulp fibers were then washed thoroughly using distilled water and homogenized in a disk refiner to break apart fibril bundles. The fiber slurry was diluted to facilitate separation of coarse and fine fractions by centrifugation at 12000G. Subsequently, the coarse fraction was rejected. The nanofibril suspension was concentrated to a solid content of approximately 0.4% using ultrafiltration. A final refining step was performed, in which the nanofibril suspension was passed once through an M-110EH-30 Microfluidizer (Microfluidics, Newton, Mass.) with 200- and 87-μm chambers in series. The obtained CNF suspension was stored at 4° C. without any treatment before future utilization. The carboxylate content of the CNFs was measured via titration based on the TAPPI Test Method T237 cm-98 and as found to be 0.46 mmol COONa per gram of CNF suspension.

Example 2

Preparation of High Density PVA Solution

Polyvinyl alcohol (10.0 g, MW: 95000 g mol-1) was dissolved in 100 mL of water and stirred for 12 h at 85° C. until the PVA was completely dissolved in water.

Example 2

Preparation of Graphene Oxide Nanosheets (GONSs)

GONSs were prepared from purified natural graphite powder using an improved Hummer's method reported by Marcano et at (*ACS Nano*, 2010, 4, 4806-4814.). 1 g of graphite flakes and 6 g of KMnO₄ (Sigma Aldrich) were added into a $H_2SO_4/H_3PO_4$ (Sigma Aldrich) mixture (135 ml:15 ml). The resulting mixture was stirred at 50° C. for 12 h. Afterward, the mixture was cooled to room temperature and then poured onto a mixture of 200 mL of ice and 1 mL of 30% $H_2O_2$. The graphite oxide was washed and centrifuged with ethanol, HCl, and water sequentially until the pH level was 7. Thereafter, the supernatant was decanted away. The remaining solid was filtered over a PTFE membrane (0.45 μm pore size) and vacuum dried overnight at room temperature.

Example 3

Preparation of Crosslinked PVA/CNF/GONS Aerogels

Two grams of PVA ($M_w$~72 kDa, Sigma Aldrich) were dissolved in 20 mL of water and stirred for 2 h until the PVA was completely dissolved in water. A CNF solution (5 mL in water was added to a glass vial followed by the addition of 2 mL of a PVA/water solution into the same glass vial. The weight ratio between the PVA and CNF was 10:1 for all formulations. Then, depending on the specific formulation, a desired amount of GONSs was added to the solution, which was then mixed vigorously for 30 minutes. Thereafter, 500 μL of glutaraldehyde (GA) (crosslinker) (25% in $H_2O$, Sigma Aldrich) followed by 100 μL of sulfuric acid (catalyst) (95.0%-98.0%, Sigma Aldrich) were added to the PVA/CNF/GONS/water solution and stirred vigorously for 1 h. The glass vial was then placed in a vacuum oven and heated for at least 2 h at 70° C. under vacuum. The resulting gel was freeze-dried and stored in a vacuum oven for further characterization. For comparison, non-crosslinked samples were also prepared.

Example 4

Preparation of High Density Crosslinked PVA/CNF/GONS Aerogels

Graphene oxide (GO) (100 mg) was added to a 50 mL centrifuge tube containing 40 mL of deionized water. The above mixture was sonicated and shaken alternately until the GO sheets were well dispersed. The PVA solution (10 mL, 10%), CNF (20 mg, 0.51%) and the dispersed GO solution were mixed together in a 250 ml flask. Depending on the specific formulation, a desired amount of water was added to the flask, and then very carefully mixed via vigorous stirring for 1 h. Subsequently, the glutaraldehyde solution (500 μL, 25%) and sulfuric acid (50 μL, 7.5%) were added to the above mixture, and stirring continued until it was uniformly mixed. Table 1 shows the various densities of crosslinked PVA/CNF/GONS aerogels. At the final stage, the mixture was placed under vacuum and sonicated to remove the bubbles from the mixture. After being transferred into the aluminum pan, the cellulose aqueous gels were cured in the oven at 75° C. for 3 h. After that, the mixture was frozen at −78° C. in dry ice-acetone solution. The frozen samples were freeze-dried in a lyophilizer at a condenser temperature of −87.0° C. and under a vacuum of 0.0014 mBar for three days.

TABLE 1

Densities of crosslinked PVA/CNF/GONS aerogels

| Sample | Density (kg/m$^3$) |
|---|---|
| 1 | 24.30 |
| 2 | 36.33 |
| 3 | 43.85 |

Example 5

Surface Modification of Crosslinked PVA/CNF/GONS Aerogels

The surface modification of the PVA/CNF/GONS aerogels was carried out by chemical vapor deposition using two different silane compounds (Silane 1: (tridecafluoro-1,1,2, 2,-tetrahydrooctyl trichlorosilane) and Silane 2: (4-(trifluoromethyl-tetrafluorophenyl)triethoxysilane). A small glass vial containing one of the selected silane compounds together with the aerogel samples was placed in a large glass jar, which was heated in a vacuum oven at 100° C. for 3 days. To remove the excess unreacted silane, the surface-treated aerogels were kept in a vacuum oven at room temperature until the vacuum level reached $3 \times 10^{-2}$ mbar or less.

Example 6

Preparation of Crosslinked RF/CNF/GONS Aerogels

The resorcinol-formaldehyde (RF)/CNF/GONS hybrid organic aerogels were prepared via a hydrolysis-condensation polymerization reaction, Al-Muhtaseb et al. (*Advanced Materials*, 15, 2003, 101-114). 165 milligrams of resorcinol (Sigma Aldrich) and 1.25 mL of formaldehyde (37% in $H_2O$, Sigma Aldrich) were dissolved in 10 mL of water. A CNF solution (5 mL) in water was added to a glass vial. The weight ratio between the RF and CNF was 10:1 for all formulations. Then, depending on the specific formulation, a desired amount of GONSs was added to the solution, which was then mixed vigorously for 30 minutes. Thereafter, a specific amount of sodium carbonate (Sigma Aldrich) was added to the RF/CNF/GONS/water solution as a basic catalyst. The molar ratio of resorcinol to catalyst (R/C) was varied from 50/1 to 200/1 mol/mol. The glass vial was then placed in a vacuum oven and heated for at least 3 days at 80° C. under vacuum. The resulting gel was freeze-dried and stored in a vacuum oven for further characterization.

Example 7

Characterization Methods

The mechanical (e.g., compressive strength and strain), physical (e.g., density, moisture absorbance, and BET surface area), and morphological properties of the aerogels prepared using the methods described above were systematically characterized. For each type of characterization described below, at least three specimens were measured for each sample and the average results were reported. The densities of the aerogels were calculated based on the measurements of their masses and dimensions. Compression testing was carried out by a dynamic mechanical analyzer (DMA Q800, TA Instruments, USA) at room temperature. The microstructures of the aerogels were investigated via a scanning electron microscope (SEM, LEO GEMINI 1530) with a field emission electron gun. The specific surface areas were determined by a Gemini (Micromeritics, USA) surface area analyzer at −196° C. using the Brunauer-Emmet-Teller (BET) method. Thermal stability measurements were carried out using a thermogravimetric analyzer (TGA, Q 50 TA Instruments, USA). The bulk thermal conductivity was measured using a thermal constants analyzer (ThermTest TPS 2500 S) following an ISO standard (ISO/DIS 22007-

2.2). A contact angle goniometer (OCA 15/20, Future Digital Scientific Corp., USA) was used for the contact angle measurements that were carried out at room temperature with water. The contact angles were measured at three different positions on each sample. The values reported were measured at 10 s, 60 s, and 120 s after deposition of the droplets. The densities of the aerogels were determined by measuring their weight and volume without deforming the soft specimens. The X-ray diffraction (XRD) patterns for different CNFs were measured with a Bruker/Siemens Hi-Star 2d Diffractometer (Bruker AXS, Madison, Wis., USA) using CuKa radiation generated at 40 kV and 30 mA. The X-ray scattering was detected with 2θ ranging from 2° to 40° at a scanning rate of 4°/min. The Raman measurements were performed at room temperature using a Thermo Scientific DXR Raman Microscope at a 532 nm laser excitation level.

Results

Densities and Compression Testing of Aerogels

FIG. 1 shows the densities of the various aerogel samples made from CNFs, GONSs, and PVA individually and together. The densities of various aerogels ranged from 10 to 60 kg/m$^3$, with cross-linked PVA/CNF/GONS showing a density of about 20 kg/m$^3$. Higher density PVA/CNF/GONS aerogels were made having densities ranging from 31.7 to 47.8 kg/m$^3$. Another aerogel of the present technology, RF/CNF/GONS exhibited a density of 51 kg/m$^3$. By contrast, silica-based aerogels are significantly denser. For example isocyanate cross-linked silica exhibited a density of at least 180 kg/m$^3$, while epoxy cross-linked silica aerogel showed a density of at least 260 kg/m$^3$. Silica aerogels with 5% or 10% ceramic fiber exhibited densities of at least 320 and 190 kg/m$^3$, respectively. Katti et al. (*Chemistry of Materials,* 2006, 18, 285-296); Meador et al., (*ACS Applied Materials and Interfaces,* 2009, 1, 894-906); Parmenter and Milstein (*Journal of Non-Crystalline Solids,* 1998, 223, 179-189)

Figure 2A:
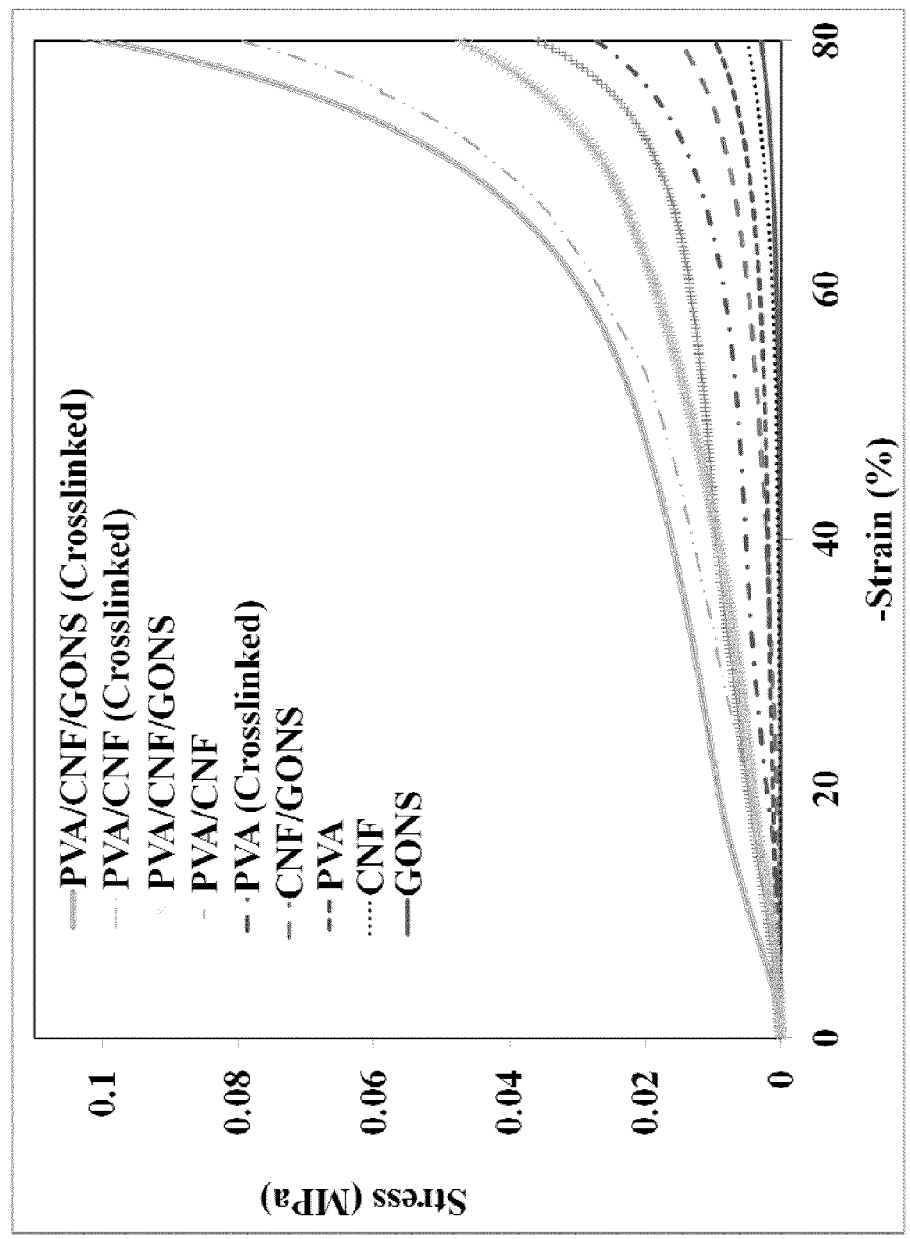
FIG. 2A is a graph comparing the compressive behaviors of illustrative embodiments of aerogels made from various formulations of cellulose nanofibrils, water-soluble graphene oxide, and polyvinyl alcohol that are either crosslinked or non-crosslinked. For clarity, the legend lists the aerogel formulations in descending order to match the order at 80% strain on the x-axis (i.e. PVA/CNF/GONS (crosslinked), PVA/CNF (crosslinked), PVA/CNF/GONS, PVA/CNF, PVA (crosslinked), CNF/GONS, PVA, CNF, GONS).
Figure 2B:
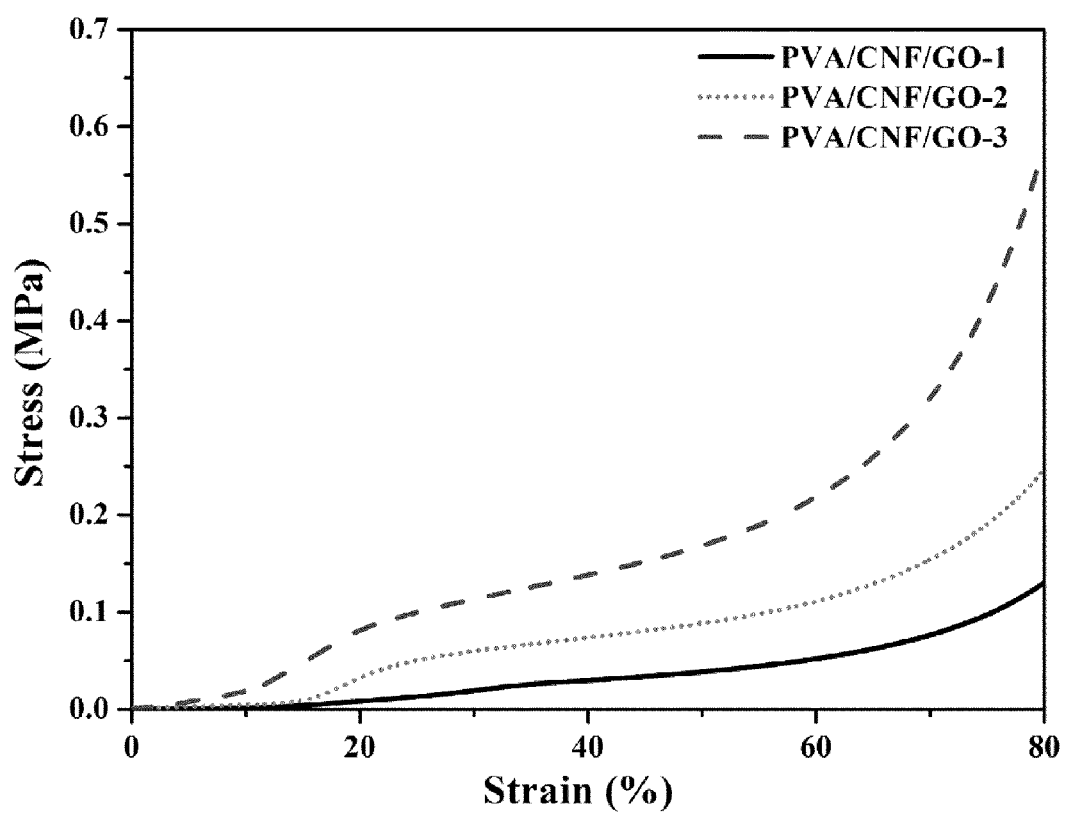
FIG. 2B is a graph comparing the compressive behaviors (at 80% strain) of illustrative embodiments of aerogels of different compositions as prepared in Example 4.

The compressive behaviors of a series of aerogels made of CNFs, GONSs, and PVA that were either crosslinked or non-crosslinked are shown in FIG. 2. The specific compressive strength of the aerogels was calculated by dividing its ultimate compressive stress at 80% strain by its density. The ultimate compressive stress of the aerogel (0.014 MPa) comprised of both GONSs and CNFs at 80% strain was more than three times higher than that of the CNF aerogel (0.004 MPa). This dramatic increase may be attributed to the strong interactions between the GONSs and CNFs via hydrogen bonding. Moreover, the addition of PVA further increased the ultimate compressive stress at 80% strain of the aerogel from 0.014 MPa to 0.1 MPa. This drastic increase can be attributed to PVA's long polymeric chains resulting in high density hydrogen bonding to CNFs and GONSs.

Figure 3:
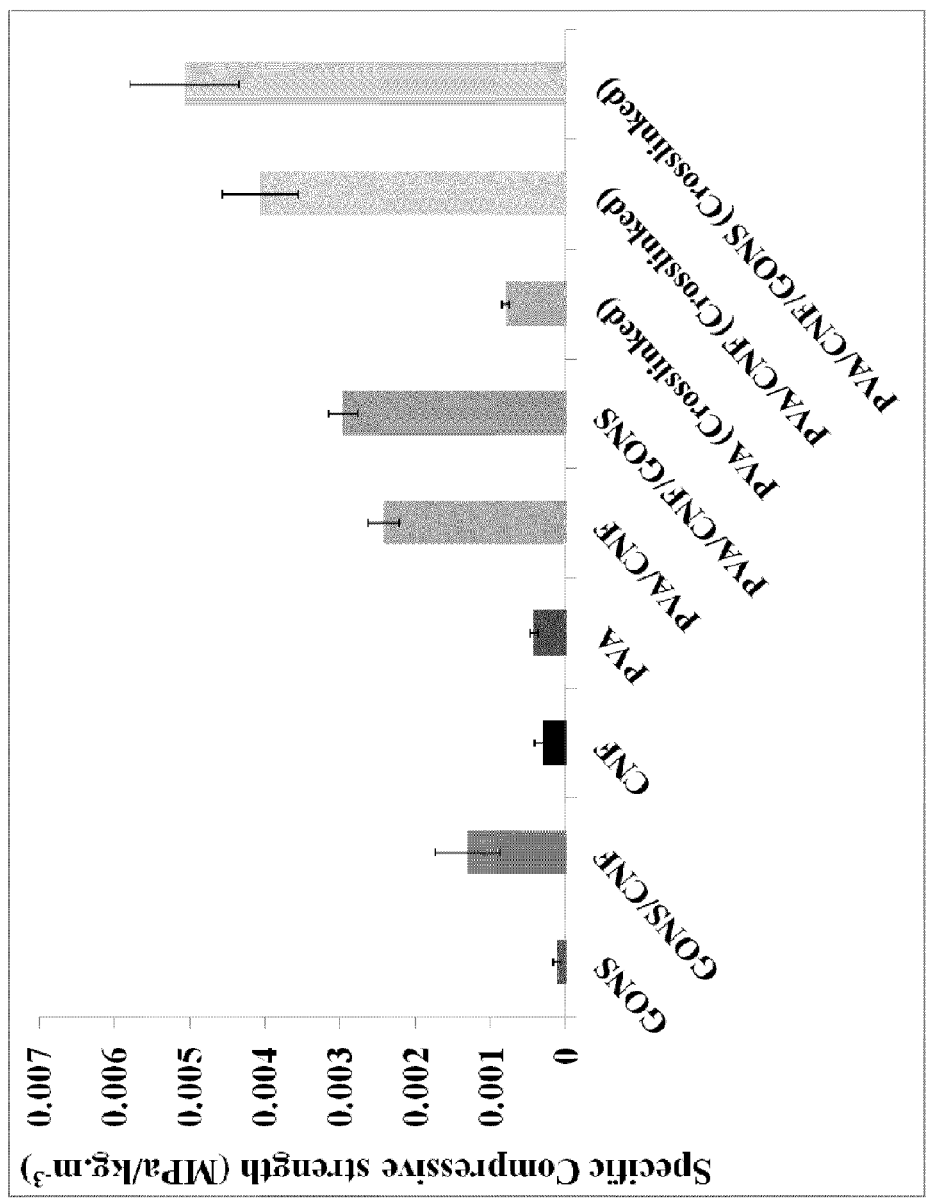
FIG. 3 is a bar graph comparing the specific compressive strengths of illustrative embodiments of aerogels made from various formulations of cellulose nanofibrils, water-soluble graphene oxide, and polyvinyl alcohol that are either crosslinked or non-crosslinked.

FIG. 3 shows the specific compressive strength of the aerogels made of various formulations consisting of CNFs, GONSs, and PVA that were either crosslinked or non-crosslinked. The specific comprehensive strength of the PVA/CNF/GONS aerogel was many orders higher than that of the neat CNF aerogel (more than 9 fold) and GONS aerogel (more than 29 fold). It was also significantly higher than aerogels made of CNF/GONS (a more than a 120% increase) or PVA (a more than a 45% increase). The specific compressive strength of the RF/CNF/GONS aerogels was as high as 0.006 MPa/kg·m$^{-3}$ While not wishing to be bound by theory, it is believed that PVA plays a major role in reinforcing the CNF/GONS network structure because PVA's long polymeric chains can provide high density hydrogen bonding to CNFs and GONSs. Moreover, the present crosslinked aerogels exhibited a much higher specific compressive strength than their non-crosslinked counterparts having the same formulations. This may be attributed to enhanced structural integrity resulting from the crosslinked PVA network as well as possible cross-linking between PVA, CNFs, and GONSs due to the presence of hydroxyl groups which could react with glutaraldheyde (GA).

Microstructures of the PVA/CNF/GONS Aerogels

Figure 4:
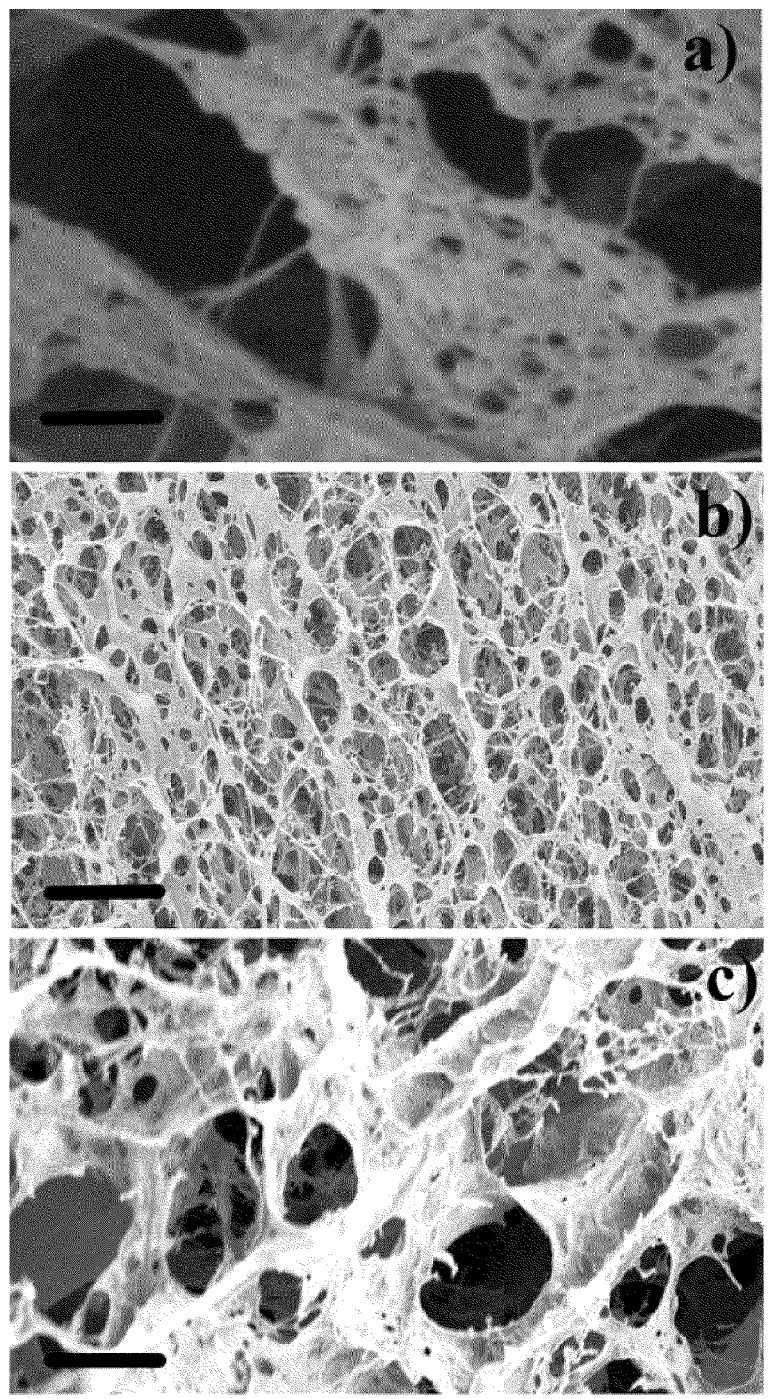
FIGS. 4A, 4B and 4C show SEM images of cellulose nanofibrils (4A), crosslinked polyvinyl alcohol (4B), and crosslinked polyvinyl alcohol/cellulose nanofibrils/water-soluble graphene oxide (4C) aerogels prepared via freeze-drying. The scale bar is 2 μm.

FIGS. 4(*a*), (*b*), and (*c*) show the SEM images of the CNF, PVA, and PVA/CNF/GONS aerogels, respectively, prepared by the freeze drying method. All three types of aerogels exhibited an interconnected sponge-like porous structure with pore sizes ranging from several tens of nanometers to a few microns. The microstructure of the CNF aerogel exhibited a hierarchical structure; i.e., there are scattered regions with lower aerogel densities which form open micron-sized channels. During the freeze-drying process, nucleation and growth of large ice crystals can occur within the network that pushed out the CNF from its original location. Subsequent sublimation of these large crystals led to the formation of micron-sized pores in the aerogels. The sublimation of these large ice crystals also resulted in the collapse of the CNF 3D network structure and the formation of scattered interconnected 2D sheet-like networks. The formation of such hierarchical structures in CNF aerogels is known.

For the PVA aerogels (FIG. 4(*b*)), the pores were qualitatively more uniform and had smaller diameters compared to those of CNF aerogel (FIG. 4(*a*)). This might be attributed to the covalent bonding between the PVA chains and the formation of a 3D network structure which does not collapse upon sublimation. For the PVA/CNF/GONS aerogels, as shown in FIG. 4(*c*), their porous structures were more uniform and their average pore sizes were smaller than those of the CNF aerogels.

Surface Wettability and Swelling Properties of the PVA/CNF/GONS Aerogels

Figure 5:
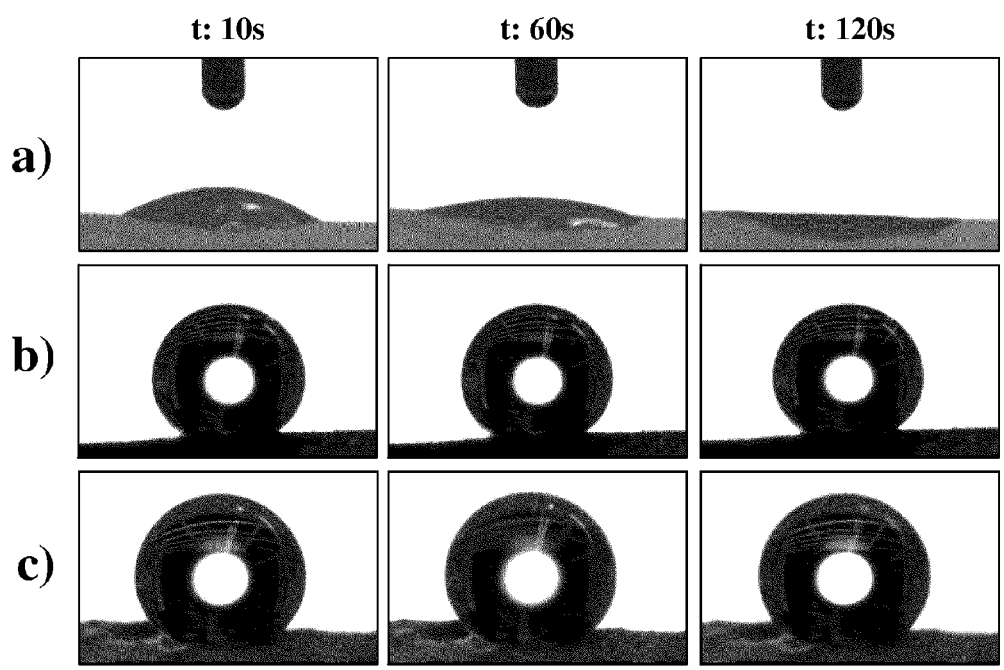
FIG. 5 shows contact angle measurements at different times (in seconds) of a) pristine polyvinyl alcohol/cellulose nanofibrils/water-soluble graphene oxide aerogels, b) polyvinyl alcohol/cellulose nanofibrils/water-soluble graphene oxide aerogels treated with Silane 1, and c) polyvinyl alcohol/cellulose nanofibrils/water-soluble graphene oxide aerogels treated with Silane 2, using water droplets.

Pristine PVA/CNF/GONS aerogels are super-hydrophilic and they tend to absorb moisture and swell in water due to the high density of the hydroxyl groups present at the surfaces of the PVA, CNFs, and GONSs. In order to obtain hydrophobic surfaces, the hydroxyl groups on the surface of the PVA/CNF/GONS aerogel structures were functionalized with silane compounds in the gaseous phase through a simple chemical vapor deposition method. Two silane compounds (Silane 1: tridecafluoro-1,2,2-tetrahydrooctyl-trichlorosilane and Silane 2: 4-trifluoromethyl-tetrafluorophenyl triethoxysilane) were studied as the coating material and the resulting wetting and swelling properties were evaluated (cf. FIGS. 5 and 6). As shown in FIG. 5(*a*), for the pristine PVA/CNF/GONS aerogel (i.e., before silane treatment), the water droplets showed a very small contact angle (θ≈28.3° at t=10 s) and were readily absorbed within the aerogel structure in less than 100 s. In contrast, surface treatment by both Silane 1 and Silane 2 drastically increased the contact angles of the water droplets on the surface of PVA/CNF/GONS aerogels (θ≈139.2° and θ≈143.6° for Silane 1 and Silane 2, respectively, at t=10 s). As can be seen in FIGS. 5(*b*) and (*c*), the water droplets maintained their initial contact angles as well as their round shapes on the silane-treated aerogel surfaces, and were not absorbed by the aerogel structures after 120 s. These observations clearly indicate that highly hydrophobic surfaces were formed after silane treatment.

Figure 6A:
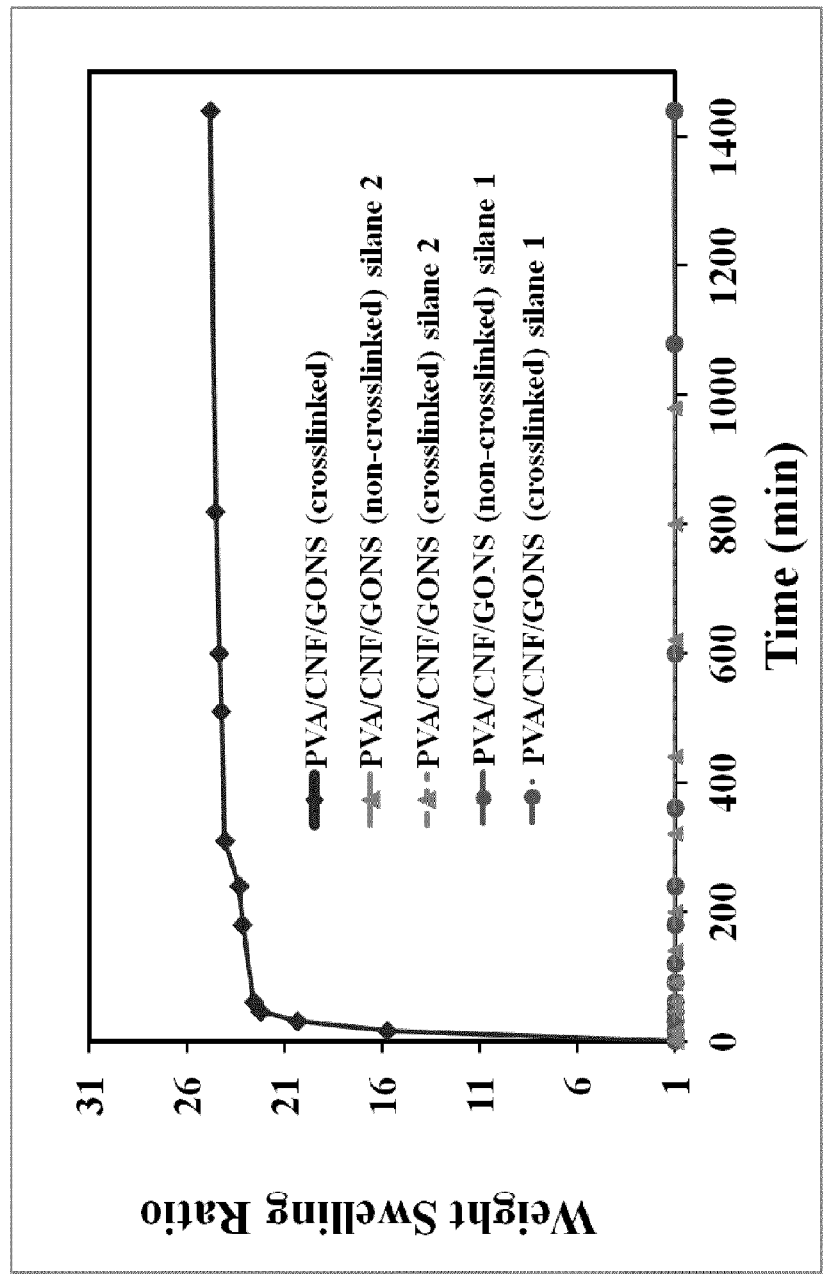
FIG. 6A is a graph showing the swelling characteristics of illustrative embodiments of polyvinyl alcohol/cellulose nanofibrils/water-soluble graphene oxide aerogels before and after silane treatment.
Figure 6B:
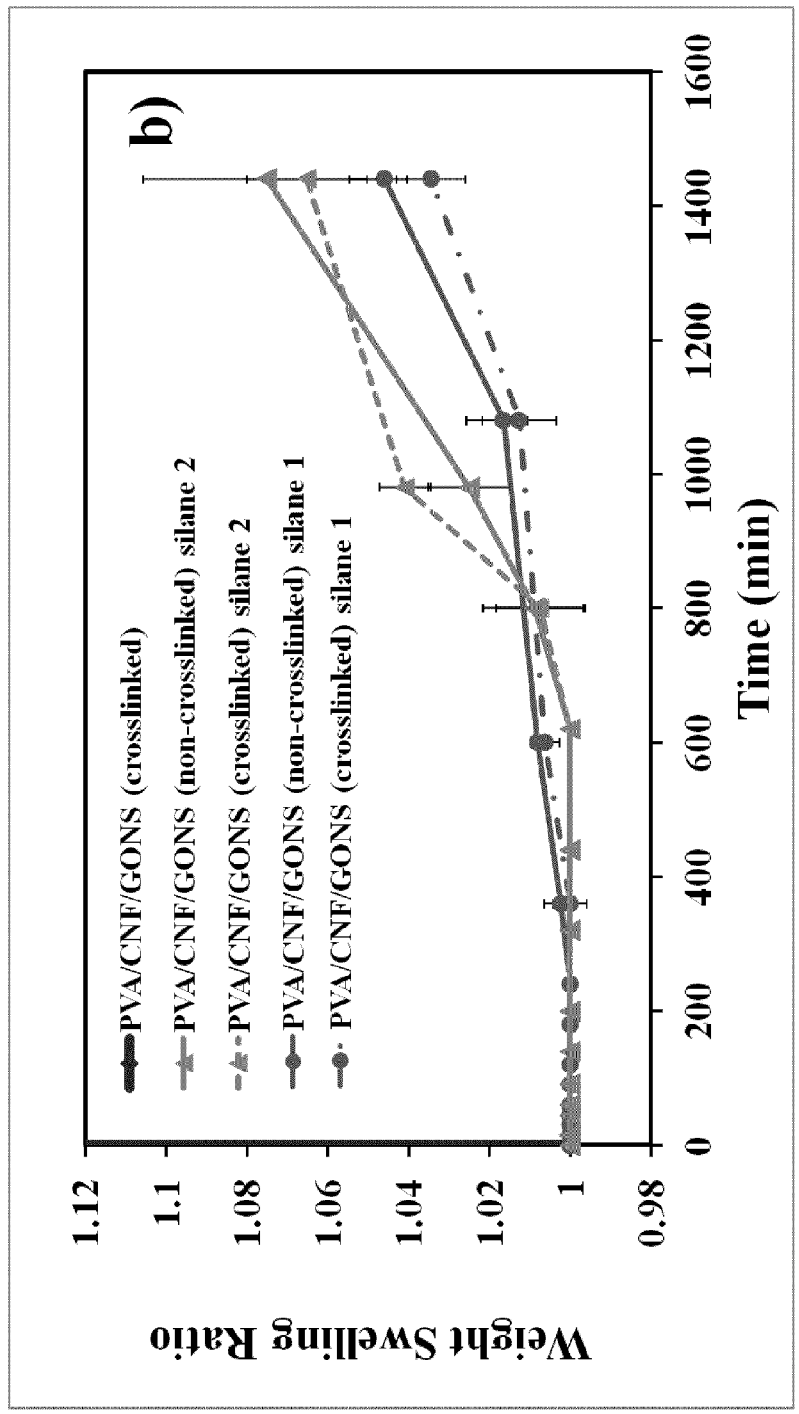
FIG. 6B is a magnified version of the bottom of FIG. 6A. For clarity, the legend lists the aerogel formulations in descending order to match the order at about 1400 minutes on the x-axis (i.e. PVA/CNF/GONS (crosslinked) (off-scale), PVA/CNF/GONS (non-crosslinked) silane 2, PVA/CNF/GONS (crosslinked) silane 2, PVA/CNF/GONS (non-crosslinked) silane 1, PVA/CNF/GONS (non-crosslinked) silane 1).

FIGS. 6A and 6B demonstrate the water swelling behavior of the crosslinked and non-crosslinked PVA/CNF/GONS aerogels before and after silane treatment. Before silane treatment, the non-crosslinked PVA/CNF/GONS aerogels were not stable in water and fell apart shortly after submersion in water. However, crosslinked PVA/CNF/GONS aerogels were stable in water and their 3D structures did not disintegrate after submersion in water due to the formation of a highly crosslinked PVA network. As can be seen in FIG. 6A, prior to silane treatment, crosslinked PVA/CNF/GONS aerogels absorbed water to more than 2300% of its initial weight after being submersed in water for 5 h. This can be attributed to the presence of hydroxyl groups on the surface of the aerogel and its super-hydrophilic nature as previously demonstrated by contact angle measurements.

However, after silane treatment (both Silane 1 and Silane 2), the non-crosslinked PVA/CNF/GONS aerogels not only were stable in water, but also demonstrated a minimum amount of swelling (4.6% for Silane 1 and 7.5% for Silane 2) after being submersed in water for 24 h (see FIG. 6B, showing a magnified view of the bottom of FIG. 6A). The improved stability of the non-crosslinked PVA/CNF/GONS aerogel structures can be attributed to the formation of a thin and interpenetrated silane coating network on the surface of the aerogel that is also highly hydrophobic. Moreover, the hydrophobic nature of the fluoro-groups on the surface of the silane coatings renders the silane-treated PVA/CNF/GONS aerogels highly hydrophobic as previously shown by contact angle measurements. In addition, as shown in FIG. 6(b), after silane treatment, the crosslinked PVA/CNF/GONS aerogels demonstrated slightly less water swelling (3.4% for Silane 1 and 6.5% for Silane 2) as compared to their non-crosslinked counterparts.

Thermal Conductivity and Thermal Stability of the Present Aerogels

For certain applications, particularly for thermal insulation applications, ultra-low thermal conductivities and high thermal stabilities are desirable. The thermal conductivity of the PVA/CNF/GONS aerogel was $453 \times 10^{-4} \pm 1 \times 10^{-4}$ $Wm^{-1}K^{-1}$ at ambient conditions, and the thermal conductivity of RF/CNF/GONS aerogel was $412 \times 10^{-4} \pm 16 \times 10^{-4}$ $Wm^{-1}K^{-1}$. The high porosity (>90%) and small-sized pores possessed by the aerogels resulted in a drastically lower thermal conductivity in comparison with their solid counterparts. This is due to the fact that thermal transportation in aerogels is governed by the gaseous phase (air), whose thermal transportation rate is significantly lower than that of the solid phase and/or radiation.

Figure 7:
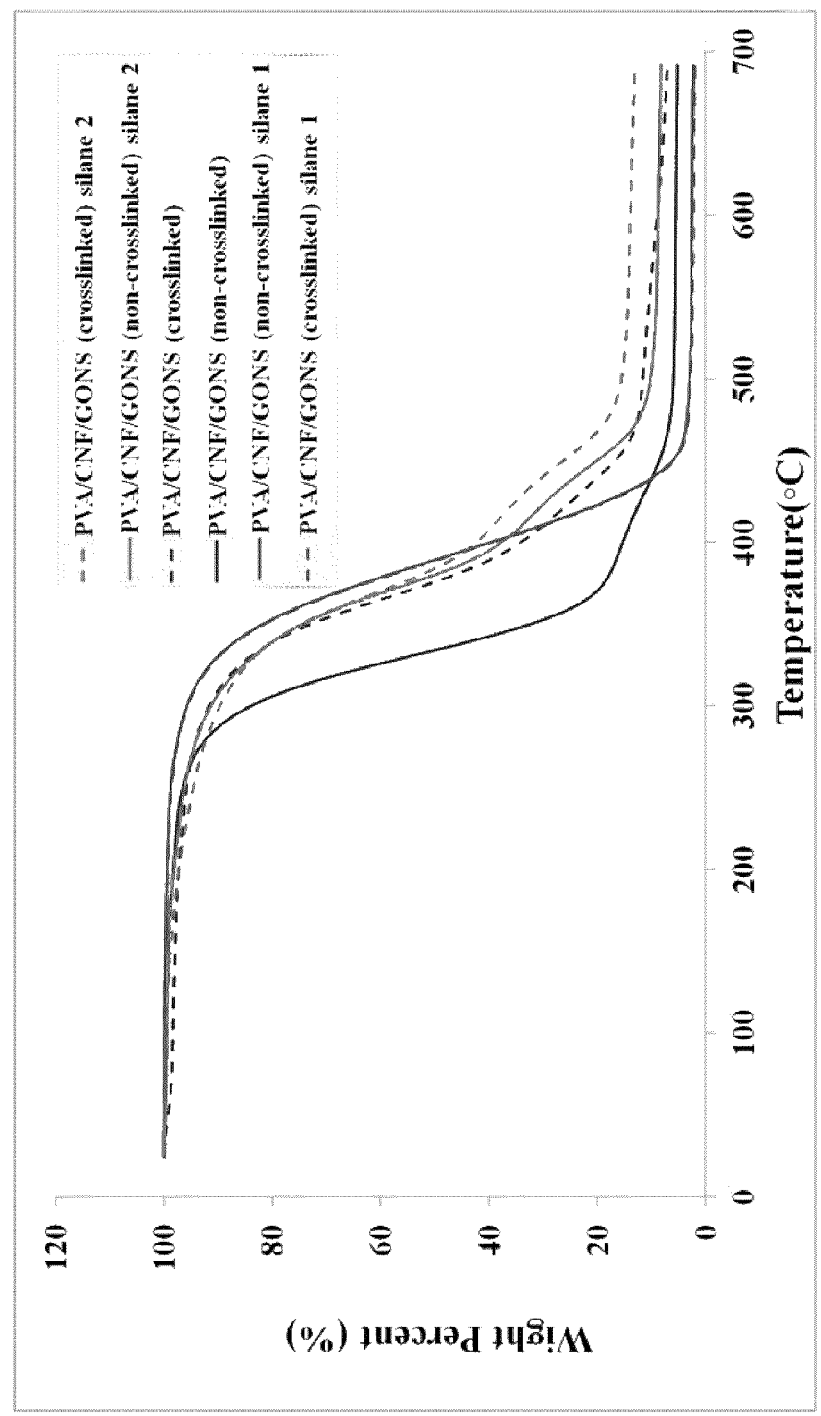
FIG. 7 is a graph of the weight loss of illustrative embodiments of polyvinyl alcohol/cellulose nanofibrils/water-soluble graphene oxide aerogels measured by thermogravimetric analysis (TGA) as a function of temperature. For clarity, the legend lists the aerogel formulations in descending order to match the order at 700° C. on the x-axis (i.e. PVA/CNF/GONS (crosslinked) silane 2, PVA/CNF/GONS (non-crosslinked) silane 2, PVA/CNF/GONS (crosslinked), PVA/CNF/GONS (non-crosslinked), PVA/CNF/GONS (non-crosslinked) silane 1, PVA/CNF/GONS (crosslinked) silane 1).

The thermal stability of the crosslinked and non-crosslinked PVA/CNF/GONS aerogels were examined before and after silane treatment using thermogravimetric analysis. As shown in FIG. 7, one significant weight loss step was observed for all the samples. However, for non-silane-treated aerogels, crosslinked PVA/CNF/GONS aerogels demonstrated considerable improvement in thermal stability over their non-crosslinked counterparts. For example, the temperatures corresponding to 20% weight loss for the crosslinked and non-crosslinked PVA/CNF/GONS aerogels were 337° C. and 305° C., respectively. While not wishing to be bound by theory, the better thermal stability exhibited by the crosslinked samples may be attributed to the formation of extra carbon-carbon bonds as the result of aerogel network crosslinking. In addition, surface treatment with both types of silane improved the thermal stability of both non-crosslinked and crosslinked PVA/CNF/GONS aerogels which can be attributed to the retardation of PVA thermal decomposition by covalent bonds formed between PVA and a silane. Upon coating the samples with Silane 1, the temperatures corresponding to 20% weight loss for the crosslinked and non-crosslinked PVA/CNF/GONS aerogels shifted to higher temperatures (339° C. for both crosslinked and non-crosslinked). The thermal stability improvement corresponding to a 20% weight loss for crosslinked and non-crosslinked PVA/CNF/GONS aerogels after treatment with Silane 2 was 353° C. and 343° C., respectively.

BET Surface Area Measurements of the PVA/CNF/GONS Aerogels

Figure 8:
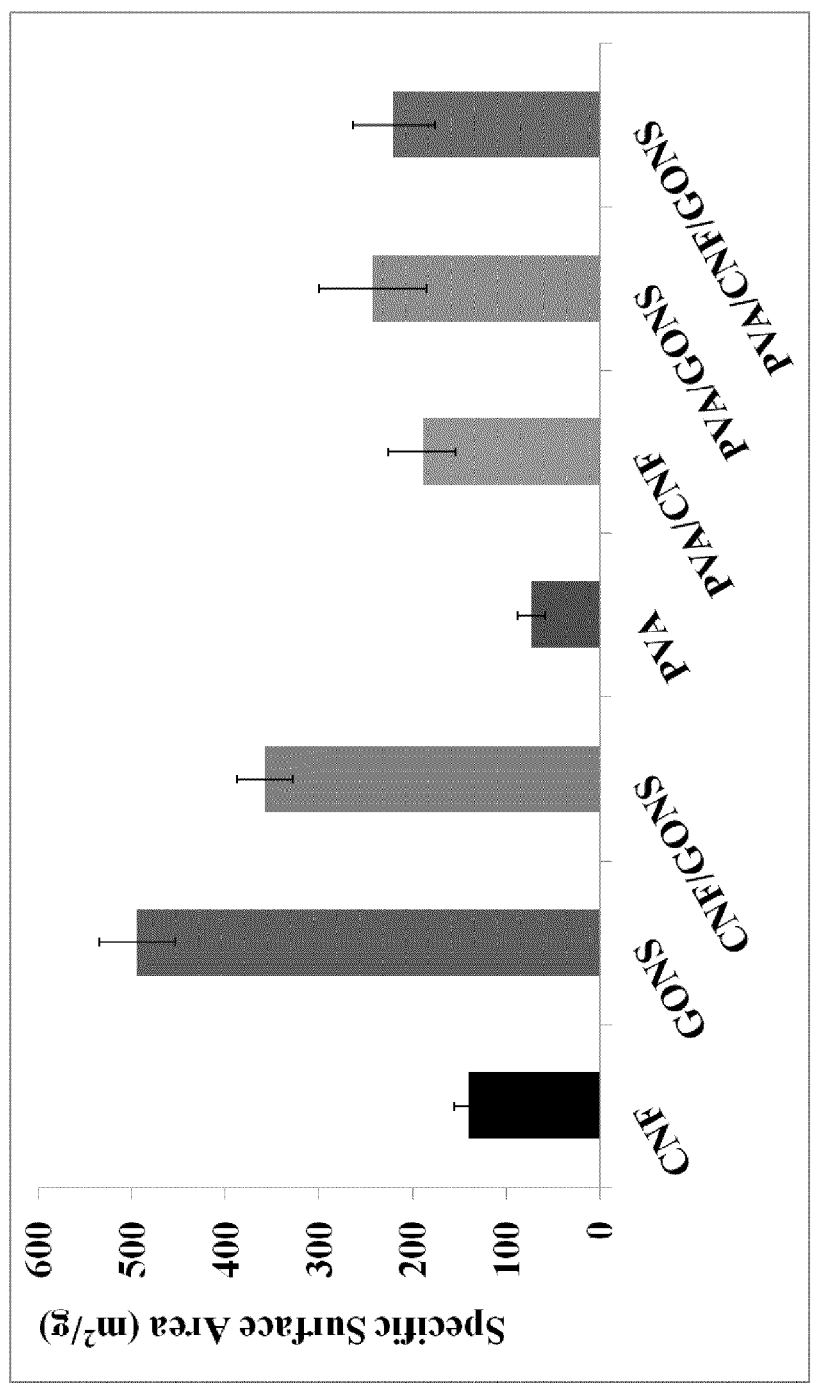
FIG. 8 is a bar graph comparing the BET specific surface areas of illustrative embodiments of polyvinyl alcohol/cellulose nanofibrils/water-soluble graphene oxide aerogels, and their composites.

The average BET specific surface area of the PVA/CNF/GONS aerogels was $220 \pm 44$ $m^2/g$, which was lower than that of the GONS ($495 \pm 41$ ($m^2/g$)), PVA/GONS ($243 \pm 57$ ($m^2/g$)), and CNF/GONS ($358 \pm 30$ ($m^2/g$)) aerogels, but was higher than that of CNF ($140 \pm 15$ ($m^2/g$)), PVA ($73 \pm 15$ ($m^2/g$)), and PVA/CNF ($190 \pm 36$($m^2/g$)) aerogels (c.f. FIG. 8).

The incorporation of two different nanofillers (i.e., CNFs and GONSs) with high specific surface areas increased the surface area of the PVA/CNF/GONS aerogels significantly in comparison with the PVA aerogels. Both CNFs and GONSs are nanofillers that can yield ultra-high surface areas depending on the level of exfoliation of the nanofillers and consequently accessible surfaces for gas adsorption.

Example 8

Preparation of Polyvinyl Alcohol (PVA)-Cellulose Nanofibril (CNF)-Multiwalled Carbon Nanotube (MWCNT) Hybrid Aerogels Materials The cellulose used for producing the CNFs was a commercially supplied fully bleached eucalyptus Kraft pulp. PVA (Mw-95000 g mol$^{-1}$), glutaraldehyde (GA, crosslinker, 25 wt % in $H_2O$), and 2,2,6,6-tetramethylpiperidinyl-1-xoyl (TEMPO, 98 wt %) were all obtained from Sigma Aldrich. Hydroxyl-functionalized MWCNTs (OH content: 3.70 wt %; aspect ratio: $1 \times 10^3 \sim 4 \times 10^3$) were obtained from Cheap Tubes (Brattleboro, Vt.). Sodium chlorite, sodium bromide, sodium hypochlorite solution, and other chemicals were of laboratory grade (Fisher scientific, USA) and used without further purification.

Preparation of CNFs

The CNFs were prepared following a similar procedure as described above. The TEMPO-oxidized CNFs used in this experiment were prepared according to a procedure described by Isogai's group (T. Saito, M. Hirota, N. Tamura, S. Kimura, H. Fukuzumi, L. Heux, A. Isogai, *Biomacromolecules* 2009, 10, 1992). Briefly, fully bleached eucalyptus fibers were oxidized with sodium hypochlorite using TEMPO as a catalyst at a temperature of 60° C. for 48 h. The fibers were then thoroughly washed and refined in a disk refiner with a gap of approximately 200 μm. The coarse fibers were separated by centrifuging at 12,000 G, and the fine CNF dispersion was concentrated to 0.5% using ultrafiltration. A final refining step was performed in which the nanofiber dispersion was passed through an M-110EH-30 microfluidizer (Microfluidics, Newton, Mass.) once with 200- and 87-im chambers in series. The obtained CNF suspension was stored at 4° C. without any treatment before future utilization.

Preparation of High Density PVA Solution

The PVA solution was prepared following a similar procedure as described above. Polyvinyl alcohol (10.0 g, MW:

95000 g mol-1) was dissolved in 100 mL of water and stirred for 12 h at 85° C. until the PVA was completely dissolved in water.

Preparation of Crosslinked PVA/CNF/MWCNT Aerogels

High concentration PVA solution (0.1 g mL-1) was prepared by dissolving 10.0 g PVA in 100 mL of water under stirring for 12 h at 85° C. Next, 25.0 mg of MWCNTs were added to a 50 mL centrifuge tube containing 10 mL of deionized water. The mixture was sonicated (UP400S, hielscher USA) at 80% amplitude using a 3 mm probe in an ice-bath for 30 min. The resulting MWCNT aqueous solution was then mixed with 20.0 g of CNF aqueous dispersion (0.5 wt %) under sonication (10 min) to gives a homogeneous CNF/MWCNT mixture. Subsequently, 5.0 mL of PVA solution (0.1 g mL-1) and a desired amount of water (depending on the specific formulation) were added into the flask containing the CNF/MWCNT aqueous solution under vigorous stirring for 1 h. The weight ratio between the PVA and CNF was 5:1 for all formulations. Thereafter, glutaraldehyde solution (300 μL, 25 wt %) and sulfuric acid (30 μL, 7.5 vol %) were added to the PVA/CNF/MWCNT solution, which was mixed under stirring for another hour. At the final stage, the mixture was subjected to sonication in an ultrasonic bath for 10 min to obtain the aqueous gels. After being transferred into aluminum pans, the aqueous gels were crosslinked/cured in a vacuum oven at 75° C. for 3 h. The aerogels were then prepared through a freeze-drying process and stored in a vacuum oven for further characterization. For all of the PVA/CNF/MWCNT aerogels, the ratio of each component was kept the same; namely, there was 4 wt. % MWCNTs, 16 wt. % CNFs, and 80 wt. % PVA. Thus, the densities of the PVA/CNF/MWCNT aerogels were controlled by the amount of water added to the mixtures.

Preparation of Crosslinked PVA Aerogels

For comparison purposes, crosslinked PVA aerogels were also prepared following a similar procedure as described above. PVA solution (5.0 mL, 10 g mL-1) and a desired amount water were mixed together in a flask under vigorous stirring for 1 h. Then, glutaraldehyde solution (250 μL, 25 wt %) and sulfuric acid (25 μL, 7.5 vol %) were added to the PVA solution. The resulting mixture was mixed under stirring for another hour. At the final stage, the mixture was sonicated in an ultrasonic bath for 10 min to obtain the aqueous gels. After being transferred into aluminum pans, the aqueous gel was crosslinked in a vacuum oven at 75° C. for 3 h. The PVA aerogels were fabricated using the freeze-drying process described herein and were stored in a vacuum oven for further characterization.

Preparation of Crosslinked PVA/CNF Aerogels

For comparison purposes, crosslinked PVA/CNF aerogels were also prepared following a similar procedure as described above. PVA solution (5.0 mL, 10 g mL-1), CNF solution (20.0 g, 0.50 wt %), and a desired amount of water (depending on the specific density of the aerogels) were mixed together in a flask under vigorous stirring for 1 h. Then, glutaraldehyde solution (300 μL, 25 wt %) and sulfuric acid (30 μL, 7.5 vol %) were added to the PVA/CNF solution. The resulting mixture was mixed under constant stirring for another hour. At the final stage, the mixture was sonicated in an ultrasonic bath for 10 min to obtain the aqueous gels. After being transferred into aluminum pans, the aqueous gels were crosslinked/cured in a vacuum oven at 75° C. for 3 h. PVA/CNF aerogels were obtained using the freeze-drying process described herein and were stored in a vacuum oven for further characterization.

Density Calculation

The density of the solid materials ($\rho s$) was calculated according to the following equation, $$\rho_s = \frac{1}{\frac{W_{MWNT}}{\rho_{MWNT}} + \frac{W_{CNF}}{\rho_{CNF}} + \frac{W_{PVA}}{\rho_{PVA}}}$$

where W was the weight percentage of the different components, and $\rho_{MWNT}$, $\rho_{CNF}$, and $\rho_{PVA}$ were the densities of solid MWCNT, CNF and PVA, respectively. The densities of the CNFs, MWCNTs, and PVA used for this study were 1460, 2100, and 1269 kg m$^{-3}$, respectively, according to the manufacturer's data sheet.

Freeze-Drying Process

The crosslinked aqueous gels were precooled in a 4° C. refrigerator overnight to avoid macroscopic fracture during the freezing step, and were then frozen at −78° C. in a dry ice-acetone solution. The frozen samples were freeze-dried in a lyophilizer at a condenser temperature of −87.0° C. under vacuum (0.0014 mBar) for three days to produce the aerogels.

Characterization

All tests described below were done at least in triplicate. The densities of the aerogels were calculated by measuring the mass and volume of the aerogels. Compression testing was conducted using an Instron (model 5967) fitted with a 100 kN load. The compression strain rate was set to 10% min$^{-1}$. Compression moduli were extracted from the slopes of the linear elastic deformation region of the stress-strain curves, while the yield stress was taken as the stress at the intersection between the tangent line to the linear elastic region and the tangent line of the plateau region. The microstructures of the aerogels were studied using a scanning electron microscope (SEM, NeoScope JCM-5000). The SEM samples were coated using gold sputtering. The Brunauer-Emmett-Teller (BET) specific surface area was determined by $N_2$ physisorption using a Gemini analyzer (Micromeritics, USA). It was measured by analyzing the amount of $N_2$ gas adsorbed on the samples with the relative vapor pressure (P/P$_0$) ranging from 0.05 to 0.3 at −196° C. Thermal stability measurements were carried out using a thermogravimetric analyzer (TGA, Q 50 TA Instruments, USA) from 30° C. to 600° C. at 10° C. min$^{-1}$ heating rate under $N_2$ protection. The bulk thermal conductivity was measured using a thermal constants analyzer (ThermTest TPS 2500 S) following an ISO standard (ISO/DIS 22007-2.2), transient Plane Source method. Measurement time ranged from 40 to 80 seconds. The laboratory temperature was 20±1° C. and the relative humidity was 22±2% during the measurements. Five measurements were made on each formulation and the average values and the standard deviations were reported.

Results and Discussion

Microstructures of the Various Aerogels

Figure 9:
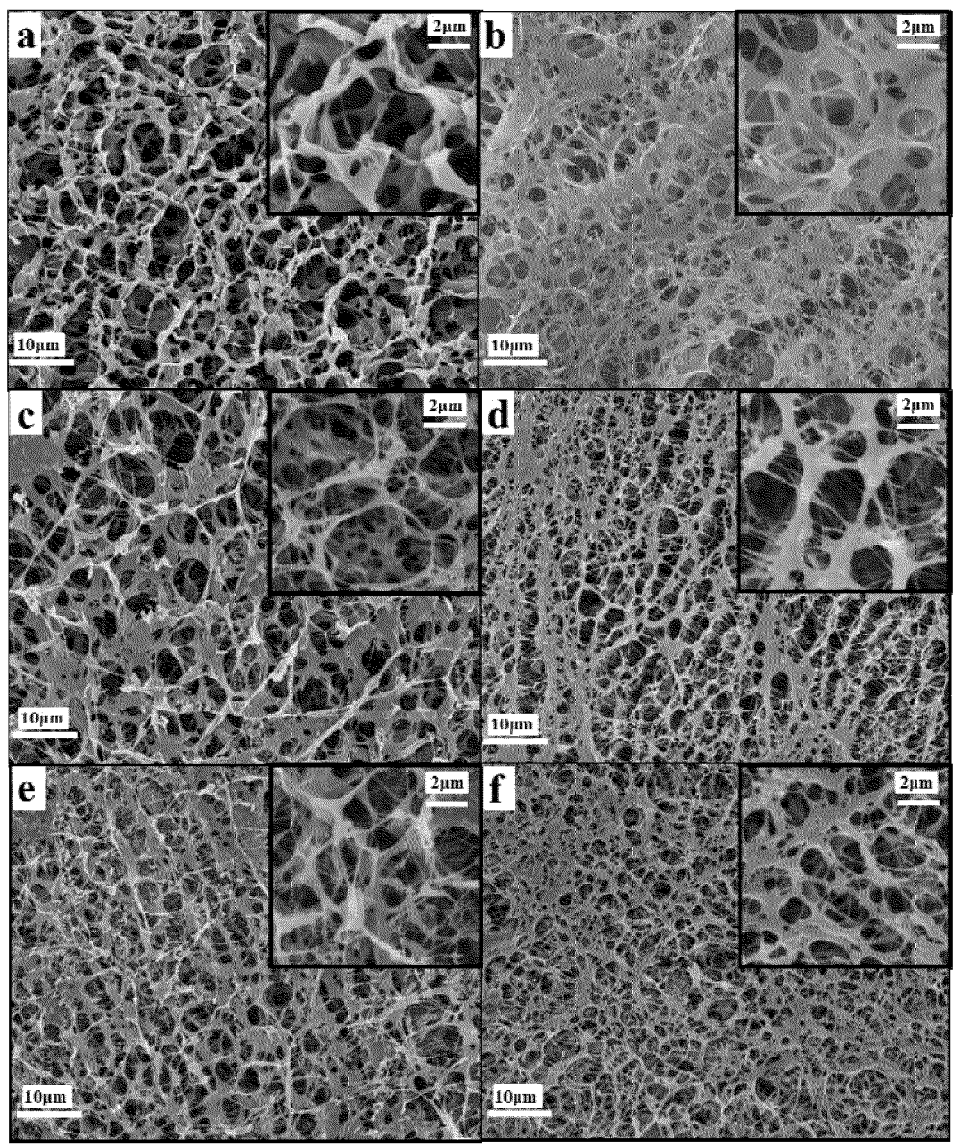
FIG. 9 is an SEM image of (A) polyvinyl alcohol (25.42 kg m$^{-3}$), (B) polyvinyl alcohol/cellulose nanofibrils (26.83 kg m$^{-3}$), and polyvinyl alcohol/cellulose nanofibrils/hydroxylated multiwalled carbon nanotube-1, 2, 3, and 4 aerogels with a density of (C) 14.55, (D) 20.13, (E) 26.00, and (F) 30.62 kg m$^{-3}$, respectively, prepared by freeze-drying. The scale bars are 10 μm and 2 μm for the main and inset pictures, respectively.

PVA, PVA/CNF, and PVA/CNF/MWCNT aerogels with four different densities were successfully prepared using the freeze-drying method. Under optimal processing conditions, very little shrinkage was observed in these aerogels compared to their initial hydrogel dimensions. While not wishing to be bound by theory, it is anticipated that the polyvinyl alcohol/cellulose nanofibrils/hydroxylated multiwalled carbon nanotube aerogels are interconnected through a 3D cross-linking cellular network. Specifically, it is predicted that the MWCNTs are covalently bonded to the glutaraldehyde, PVA, and/or CNF via the hydroxyl group of the MWCNT. FIG. 9 shows the microstructures of the various aerogels including (A) PVA (25.42 kg m$^{-3}$), (B) PVA/CNF (26.83 kg m$^3$), and the PVA/CNF/MWCNT-1, 2, 3, and 4 hybrid aerogels with a density of (C) 14.55, (D) 20.13, (E) 26.00, and (F) 30.62 kg m$^{-3}$, respectively. All aerogels exhibited an interconnected, highly porous cellular structure. At similar densities (~26 kg m$^3$), the pore sizes of PVA (FIG. 9A, typically 3~8 μm) were somewhat larger than those of the PVA/CNF (FIG. 9B, typically 1~5 μm)) and PVA/CNF/MWCNT-3 (FIG. 9E, typically 1~4 μm)). While not wishing to be bound by theory, this observation might be attributed to the fact that CNFs and/or MWCNTs could easily entangle and form a 3D network within the PVA/CNF or PVA/CNF/MWCNT aerogel network thereby affecting the nucleation and growth of ice crystals during the freeze-drying process. For the PVA/CNF/MWCNT aerogels with varying densities (FIGS. 9C, D, E, F), the pore sizes appeared to be slightly smaller at higher aerogel densities. In addition, for the PVA/CNF and PVA/CNF/MWCNT hybrid aerogels, there were nanosized fibers connecting the sheet-like structures present in these hybrid aerogels. These highly interconnected 3D cellular networks may be responsible for the aerogels' outstanding mechanical properties.

BET Surface Areas of the Aerogels

The BET specific surface area of the aerogels is shown in Table 2. The surface areas of the aerogels prepared by the freeze-drying process are often lower than those of aerogels prepared using supercritical $CO_2$ drying because the initial hydrogel network structure can be preserved better in aerogels prepared using supercritical drying compared to freeze-drying.

At similar aerogel densities (~26 kg m$^3$), incorporation of CNFs and MWCNTs (i.e., PVA/CNF and PVA/CNF/MWCNT-3) significantly increased the specific surface areas of the PVA aerogels likely due to the small pore sizes as well as the high surface areas associated with CNFs and MWCNTs. The surface areas of the PVA/CNF/MWCNT aerogels decreased slightly with an increasing aerogel density, which may be attributed to the lower porosity at higher densities.

TABLE 2

Physical and mechanical properties of aerogels prepared by the freeze-drying method.

| Sample | Density (kg m$^{-3}$) | Relative density ($\rho^*/\rho_s$) | Young's modulus (kPa) | Yield Stress (kPa) | $S_{BET}$ (m$^2$ g$^{-1}$) |
|---|---|---|---|---|---|
| PVA | 25.42 ± 0.85 | — | 17 ± 3 | 3.9 ± 0.3 | 79 ± 6 |
| PVA/CNF | 26.83 ± 1.01 | — | 150 ± 11 | 22.6 ± 1.4 | 156 ± 12 |
| PVA/CNF/MWCNT-1 | 14.55 ± 0.78 | 0.01104 | 54 ± 5 | 8.8 ± 0.7 | 196 ± 17 |
| PVA/CNF/MWCNT-2 | 20.13 ± 0.65 | 0.01528 | 142 ± 9 | 18.5 ± 0.8 | 187 ± 15 |
| PVA/CNF/MWCNT-3 | 26.00 ± 0.73 | 0.01974 | 302 ± 7 | 32.3 ± 0.6 | 181 ± 16 |
| PVA/CNF/MWCNT-4 | 30.62 ± 1.19 | 0.02325 | 494 ± 15 | 47.5 ± 1.4 | 175 ± 20 |

Mechanical Properties of the Aerogels

Figure 10A:
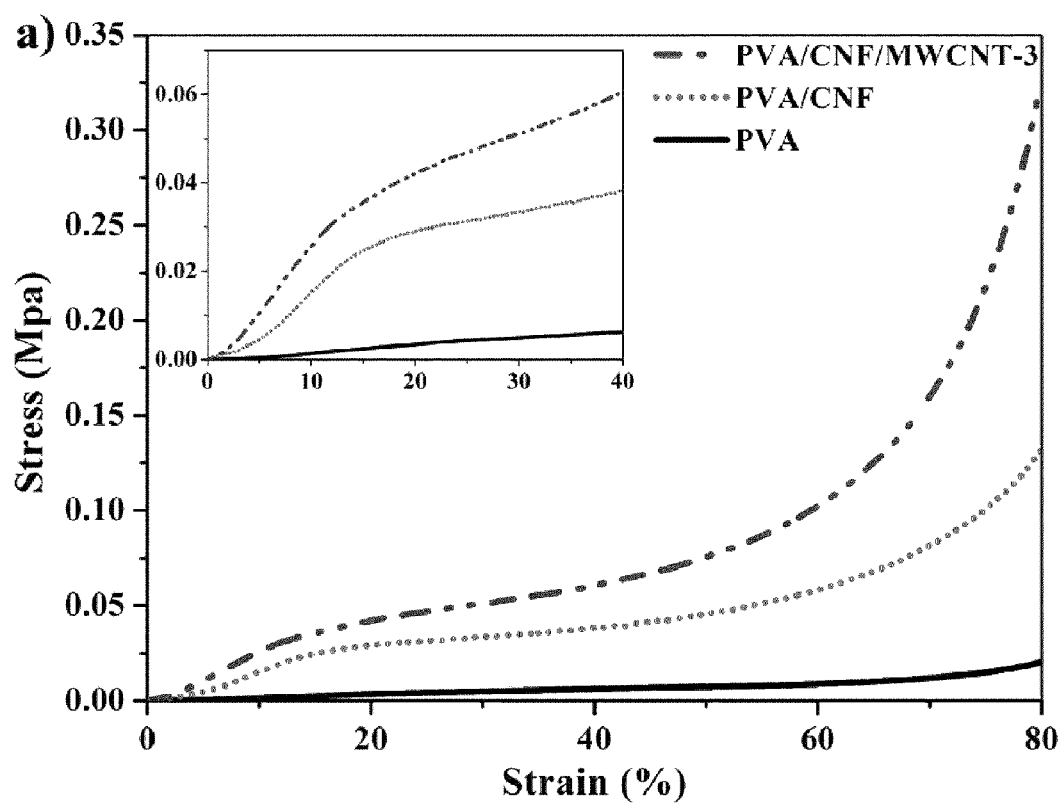
FIG. 10A is a graph showing the compression stress-strain curves of polyvinyl alcohol, polyvinyl alcohol/cellulose nanofibrils, and illustrative embodiments of polyvinyl alcohol/cellulose nanofibrils/hydroxylated multiwalled carbon nanotube-3 aerogels at similar densities (~26 kg/m$^3$).
Figure 10B:
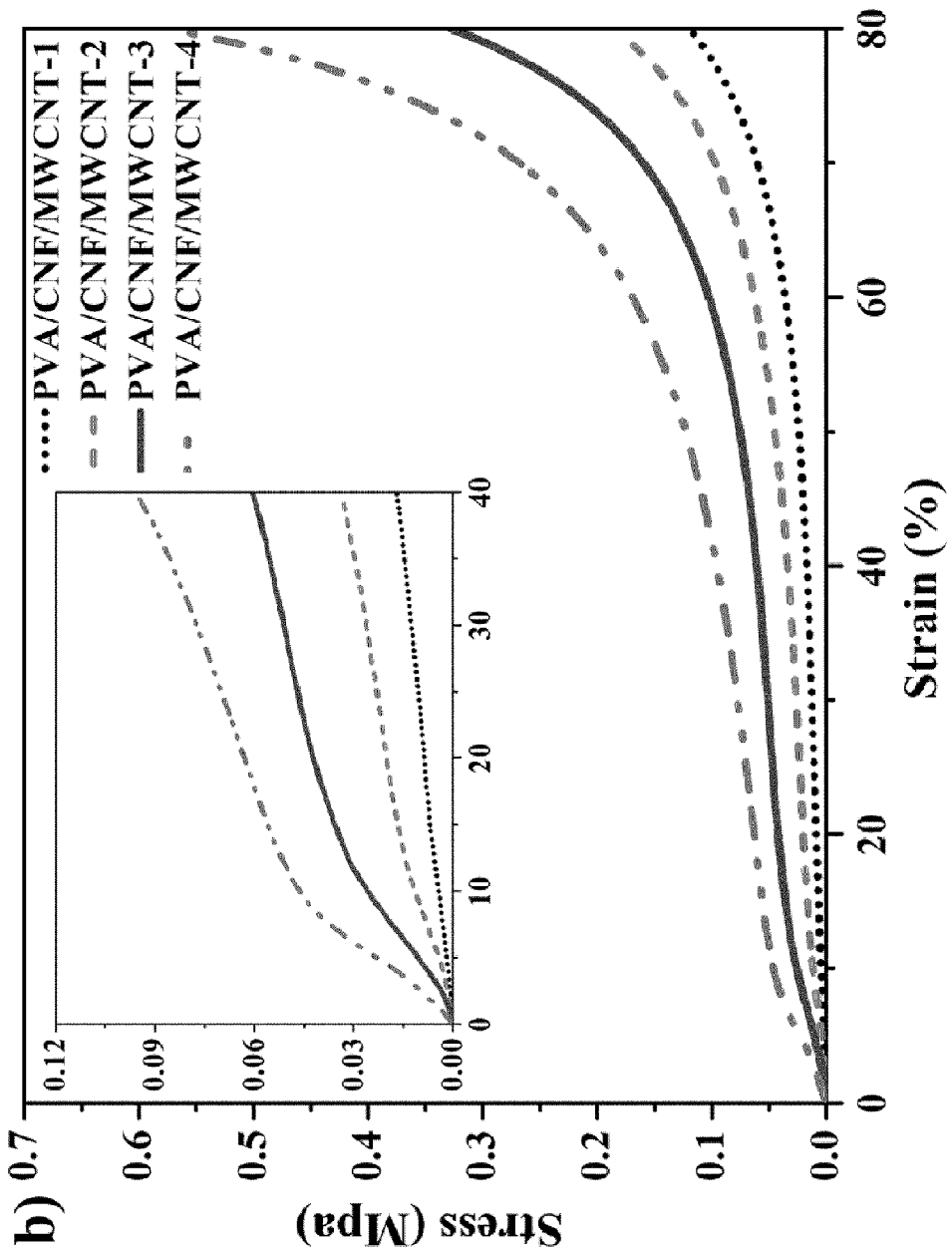
FIG. 10B is a graph showing the compression stress-strain curves of illustrative embodiments of polyvinyl alcohol/cellulose nanofibrils/hydroxylated multiwalled carbon nanotube-1, 2, 3, and 4 aerogels with varying densities.

FIG. 10A shows the compression stress-strain curves for the PVA, PVA/CNF, and PVA/CNF/MWCNT-3 aerogels with similar densities (~26 kg m$^{-3}$). The compressive modulus of the PVA/CNF aerogels (16 wt % CNFs, 150 kPa) was more than eight times higher than that of the pure PVA aerogels (17 kPa). While not wishing to be bound by theory, this dramatic increase may be attributed to two factors: (1) the CNFs had excellent mechanical properties making them a desirable reinforcing nanofiller for polymers, (2) cross-linking between the uniformly dispersed CNFs and PVA through a reaction between the hydroxyl groups present on both CNFs and PVA with the glutaraldehyde crosslinker further strengthened the hybrid aerogels. The addition of a small amount of hydroxyl-functionalized MWCNTs (4 wt %) further increased the compressive modulus of the aerogels (i.e., PVA/CNF/MWCNT-3) from 150 kPa to 302 kPa accounting for the twofold increase. Similar to CNFs, MWCNTs also exhibit excellent mechanical properties and thus are a desirable reinforcing nanofiller. Furthermore, CNFs and MWCNTs both have high aspect ratios, making it possible for them to form an entangled 3D network in the aerogels. Lastly, these MWCNTs were functionalized with hydroxyl groups, thereby enabling them to be covalently integrated into the PVA/CNF/MWCNT network through the crosslinking reaction. FIG. 10B shows the compression stress-strain curves of the PVA/CNF/MWCNT aerogels at different densities. Similar to other elastomeric foams, three characteristic deformation regions can be observed by the curves: (1) a linear elastic deformation region at low strain due to elastic wall bending, (2) a plateau region with slowly increasing stress after reaching a yield stress due to plastic yielding of the cell wall material, and (3) a densification region at higher strain where the stress rose sharply with the strain due to densification of the porous structures.

Figure 11A:
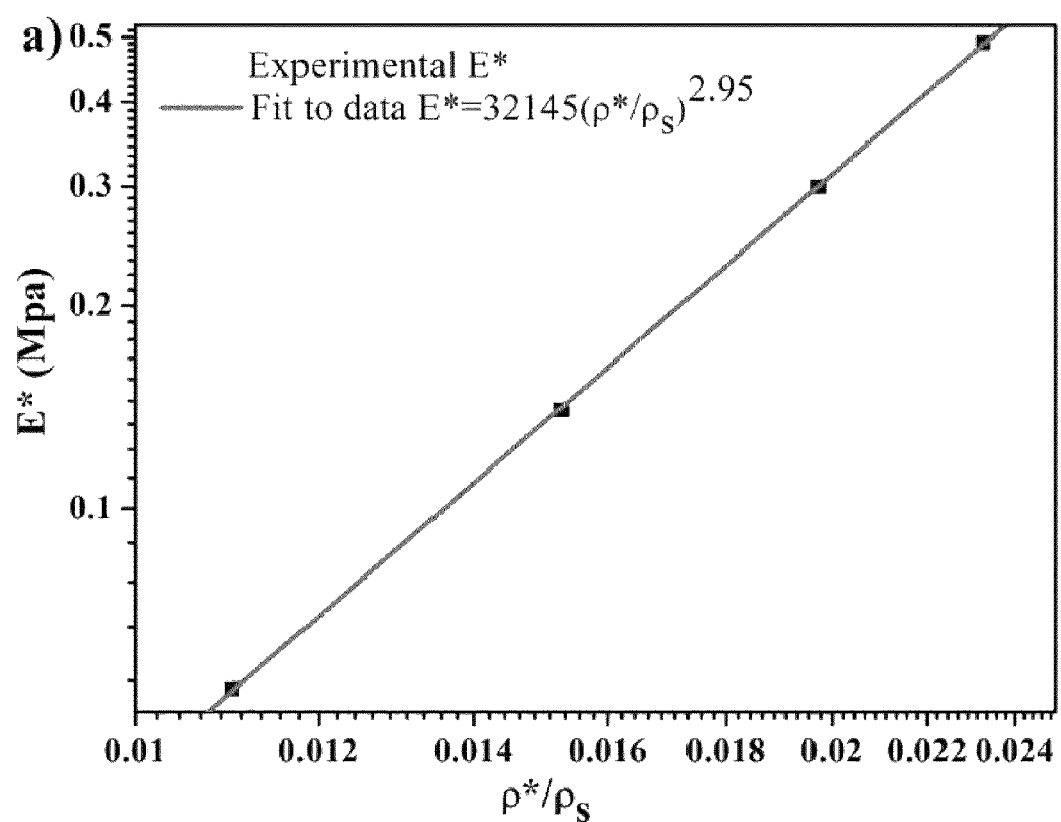
FIG. 11A is a graph showing the Young's modulus (E*) of the exponential correlation of the yield stress (E*) and relative density ($\rho^*/\rho_s$) of illustrative embodiments of polyvinyl alcohol/cellulose nanofibrils/hydroxylated multiwalled carbon nanotube aerogels.
Figure 11B:
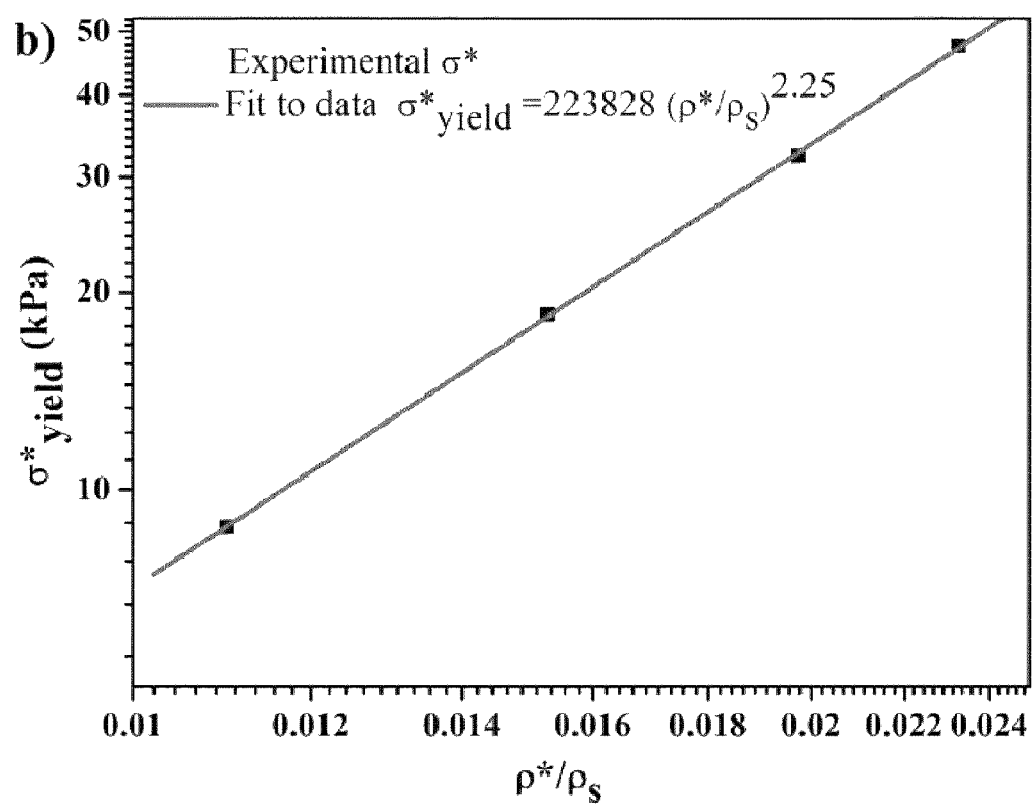
FIG. 11B is a graph illustrating the exponential correlation of the yield stress ($\sigma^*$) and relative density ($\rho^*/\rho_s$) of illustrative embodiments of polyvinyl alcohol/cellulose nanofibrils/hydroxylated multiwalled carbon nanotube aerogels.

The mechanical properties of the PVA/CNF/MWCNT aerogels are summarized in Table 2. They had a strong dependence on density. For instance, the Young's modulus and yield stress of PVA/CNF/MWCNT-4 (30.62 kg m$^{-3}$) was more than 9- and 5-fold higher, respectively, than those of the PVA/CNF/MWCNT-1 (14.55 kg m$^{-3}$). The modulus of the PVA/CNF/MWCNT-4 aerogels (30.62 kg m$^3$) was 494 kPa, which was more than 6-fold higher than that of the polymer/clay/nanotube aerogels with a density of 30 kg m$^{-3}$ (79 kPa). FIG. 11 is plot of the correlation between the mechanical properties (i.e., the Young's modulus (E*) (FIG. 11A) and yield stress (σ*) (FIG. 11B) of the PVA/CNF/MWCNT aerogels with their relative densities ($\rho^*/\rho_s$). The densities of the solid materials ($\rho_s$) were calculated according to the solid density of each component and their weight ratios used in the formulation (Supporting information). The Young's modulus E* and yield stress σ* were found to scale with the relative density exponentially, namely, $E^* \sim (\rho^*/\rho_s)^{2.95}$ and $\sigma^* \sim (\rho^*/\rho_s)^{2.25}$. Similar Young's modulus and relative density correlations were reported in other types of low-density nanoporous materials with the exponent ranging from 1.8 to 3.7 depending on the microstructure and formulations of the materials.

Thermal Conductivity and Thermal Stability of PVA/CNF/MWCNT Aerogels

The thermal conductivities for the PVA/CNF/MWCNT-2, 3, and 4 aerogels measured at room temperature were 28.58±0.02, 29.26±0.03, and 30.79±0.03 mWm$^{-1}$K$^{-1}$, respectively, thereby making them suitable as mechanically strong, ultralight thermal insulating materials. Thermal transport in aerogels occurs via three mechanisms including gaseous conduction, solid conduction, and radiation. Solid conduction increases with an increasing density whereas gaseous conduction and infrared radiative transfer decreases with an increasing density. Previous studies via both modeling and simulations, as well as experiments, have shown that the thermal conductivity of aerogels decreases with increasing density in the ultra-low density region until it reaches a minimum when the density ranges from 75 to 125 kg m$^{-3}$ (depending on the aerogel material), and then increases with increasing density. The thermal conductivity in our PVA/CNF/MWCNT aerogels is mainly governed by the gaseous conduction due to the ultra-low density (<31 kg m$^3$). However, the thermal conductivity of the PVA/CNF/MWCNT aerogels increased with density. This is likely due to the fact that there was a higher amount of MWCNTs present in the higher density hybrid aerogels than the lower density hybrid aerogels, although the percentage of each component in the formulation remained the same. MWCNTs have excellent thermal conductivity (2×10$^5$ mW m$^{-1}$K$^{-1}$) which can induce higher solid conduction in aerogels leading to high thermal conductivity.

Figure 12A:
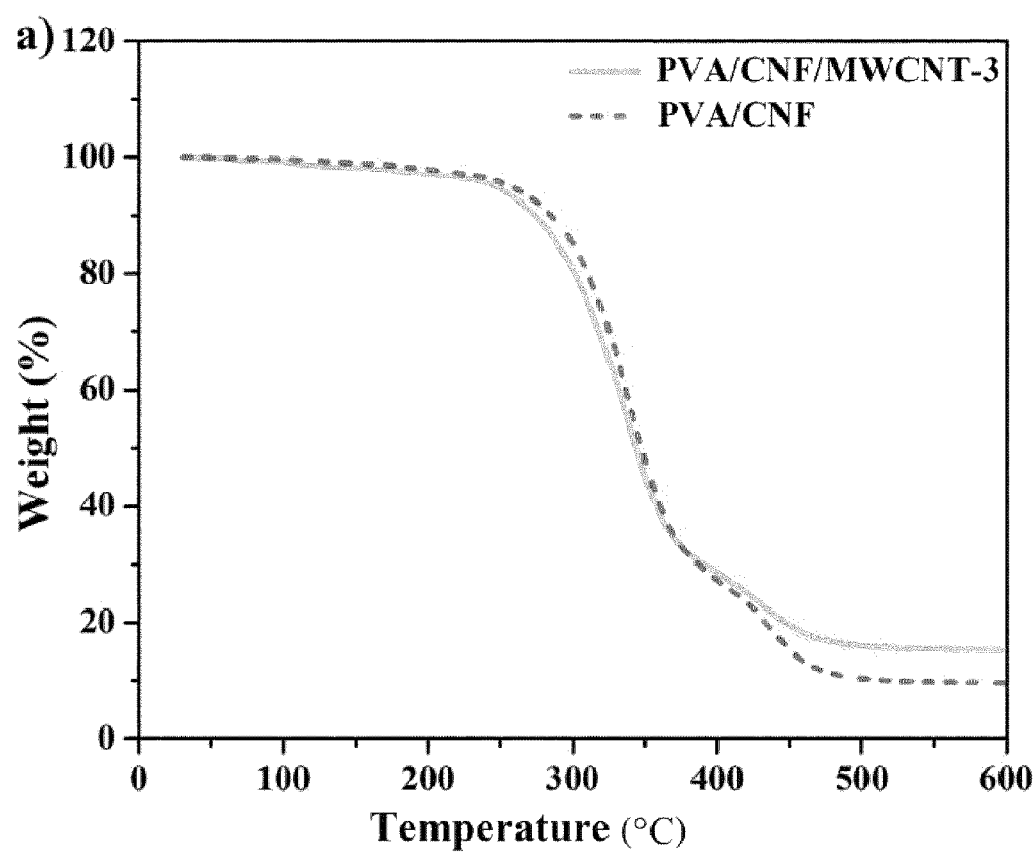
FIG. 12A is a graph showing the thermogravimetric analysis (TGA) curves of illustrative embodiments of polyvinyl alcohol/cellulose nanofibrils and polyvinyl alcohol/cellulose nanofibrils/hydroxylated multiwalled carbon nanotube-3 aerogels at a similar density (~26 kg m$^{-3}$).
Figure 12B:
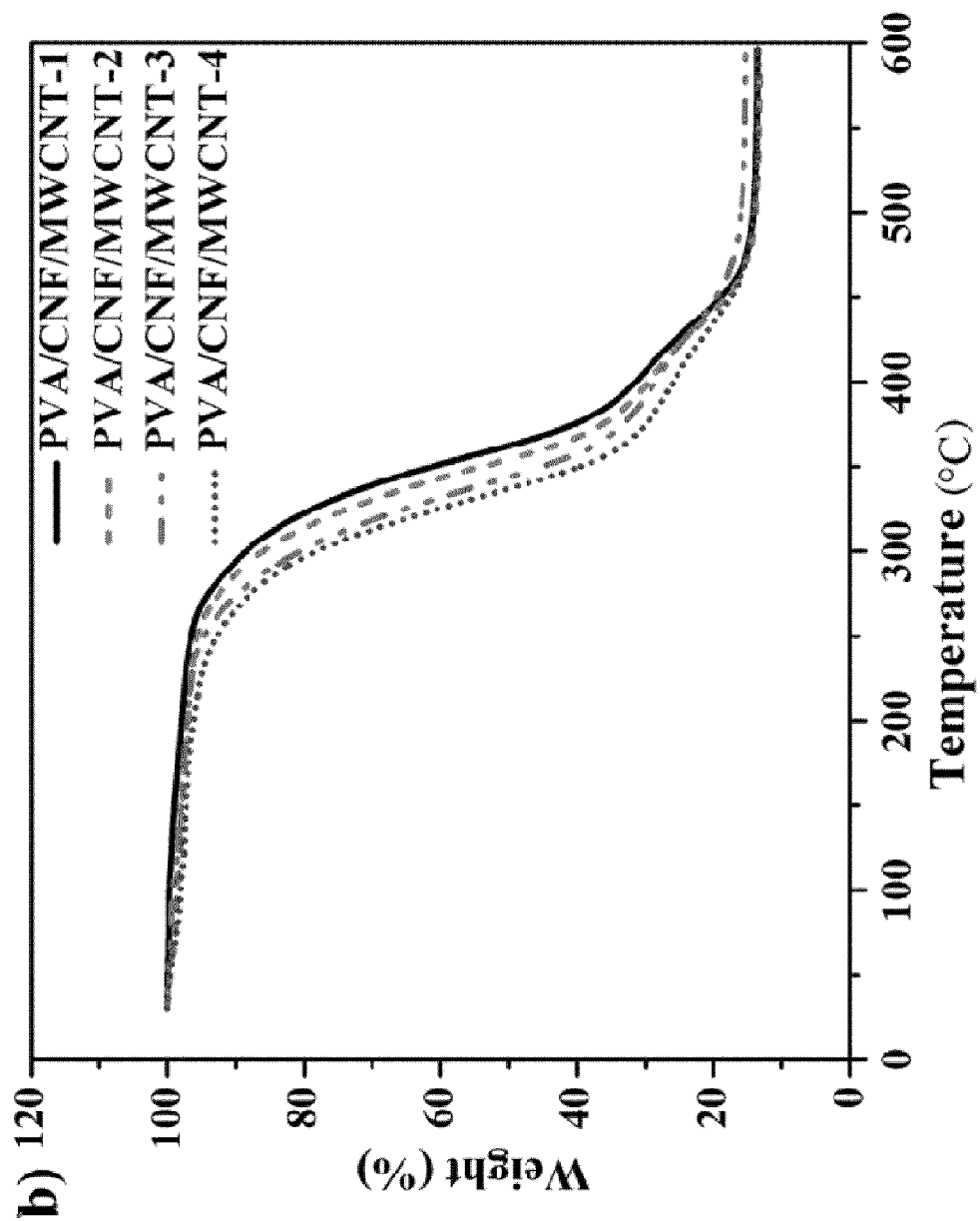
FIG. 12B is a graph illustrating the TGA curves of illustrative embodiments of polyvinyl alcohol/cellulose nanofibrils/hydroxylated multiwalled carbon nanotube-1, 2, 3, and 4 aerogels at different densities.

The thermal stability of the various aerogels was measured by TGA in nitrogen from room temperature to 600° C. and is shown in FIG. 12. The thermal stability of the PVA/CNF/MWCNT aerogel decreased in comparison with the PVA/CNF aerogel as shown in FIG. 12A. For example, the temperatures corresponding to a 10% weight loss in the PVA/CNF aerogels (287° C.) were higher than that of the PVA/CNF/MWCNT-3 (274° C.). This may be attributed to the PVA/CNF/MWCNT aerogel's higher BET surface area and thermal conductivity as compared to PVA/CNF, making it more susceptible to thermal degradation. The PVA/CNF/MWCNT aerogels produced 4 wt % more carbonaceous residues after thermal degradation, which was equivalent to the amount of MWCNTs incorporated in the PVA/CNF/MWCNT aerogels. The thermal stability of the PVA/CNF/MWCNT aerogels decreased slightly with increasing density (FIG. 12B), which may be attributed to higher thermal conductivities at higher aerogel densities.

CONCLUSION

High-performance "green" PVA/CNF/MWCNT hybrid organic aerogels were prepared using an inexpensive and environmentally friendly method with renewable materials. These unique PVA/CNF/MWCNT hybrid aerogels had ultra-low densities (<31 kg m$^{-3}$), high surface areas (160-200 m$^2$ g$^{-1}$), and very low thermal conductivities (<31 mWm$^{-1}$K$^{-1}$). Moreover, the PVA/CNF/MWCNT hybrid organic aerogels demonstrated excellent mechanical properties, which can be attributed to the excellent mechanical properties of CNFs and MWCNTs, and the strong interactions between PVA, CNF, and MWCNTs via both chemical crosslinking and the formation of entangled 3D networks. The mechanical properties of the PVA/CNF/MWCNT aerogels had an exponential correlation with their relative densities. These environmentally friendly and mechanically robust aerogels can potentially be used for a wide range of applications including thermal insulation, structural components, and catalyst supports.

EQUIVALENTS

The embodiments, illustratively described herein, may suitably be practiced in the absence of any element or elements, limitation or limitations, not specifically disclosed herein. Thus, for example, the terms "comprising," "including," "containing," etc., shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent compositions, apparatuses, and methods within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art, all language such as "up to," "at least," "greater than," "less than," and the like, include the number recited and refer to ranges which can be subsequently broken down into subranges as discussed above. Finally, as will be understood by one skilled in the art, a range includes each individual member.

While certain embodiments have been illustrated and described, it should be understood that changes and modifications can be made therein in accordance with ordinary skill in the art without departing from the technology in its broader aspects as defined in the following claims.

What is claimed is:

1. An aerogel comprising:
    a water-soluble organic polymer having a weight-average molecular weight
    ranging from about 15,000 to about 150,000 Da,
    cellulose nanofibrils and/or nanocrystals, and
    water-soluble graphene oxide,
    wherein the water-soluble polymer, and the cellulose nanofibrils and/or nanocrystals are cross-linked to each other with a crosslinker such that the water-soluble organic polymer is no longer water-soluble; and wherein the aerogel has a density of not more than about 100 kg/m$^3$ and a compressive modulus of about 50 kPa to about 500 kPa.

2. The aerogel of claim 1, wherein the water-soluble organic polymer is a thermoplastic polymer.

3. The aerogel of claim 1, wherein the water-soluble organic polymer is polyvinyl alcohol, polyethylene glycol, polyacrylamide, polyacrylic acid, polymethacrylic acid, or a combination of any two or more thereof.

4. The aerogel of claim 1 wherein the water-soluble polymer is polyvinyl alcohol.

5. The aerogel of claim 1, wherein the water-soluble organic polymer is a thermoset polymer comprising at least 90 mol % water-soluble organic monomers.

6. The aerogel of claim 1, wherein the water-soluble organic polymer is polymerized resorcinol-formaldehyde, phenol-formaldehyde, urea-formaldehyde, polyamic acid salt or a combination of any two or more thereof.

7. The aerogel of claim 1, wherein the water-soluble polymer is polymerized resorcinol-formaldehyde.

8. The aerogel of claim 1, wherein the crosslinker is sodium borate, boric acid, organic dialdehyde, or a combination of any two or more thereof.

9. The aerogel of claim 1, wherein the cellulose nanofibrils or nanocrystals have a diameter of about 5 to about 30 nm and length of about 10 nm to about 8 micrometers.

10. The aerogel of claim 1, wherein the water-soluble graphene is graphene oxide nanosheets.

11. The aerogel of claim 1, further comprising a surface modifier.

12. The aerogel of claim 11 wherein the crosslinker is glutaraldehyde.

13. The aerogel of claim 11 wherein the surface modifier is a silane compound.

14. The aerogel of claim 13 wherein the silane is a trialkylsilane, a dialkylarylsilane, an alkyldiarylsilane, a triarylsilane, a trichlorosilane, or a combination of any two or more thereof.

15. The aerogel of claim 1, having a specific compressive strength ranging from about 0.001 MPa/kg m$^3$ to about 0.1 MPa/kg m$^3$.

16. The aerogel of claim 1, having a strain-at-failure of at least about 60%.

17. The aerogel of claim 1, having a porosity of at least about 90%.

18. The aerogel of claim 1, having a thermal conductivity of about 10 mWm$^{-1}$K$^{-1}$ to about 60 mWm$^{-1}$K$^{-1}$.

19. An insulation composition comprising an aerogel of claim 1.

20. The insulation composition of claim 19 wherein the insulation is thermal insulation, acoustic insulation or electrical insulation.

21. An aerogel comprising:
   a water-soluble organic polymer,
   cellulose nanofibrils and/or nanocrystals, and
   water-soluble graphene oxide,
   wherein the water-soluble polymer and the cellulose nanofibrils and/or nanocrystals are cross-linked to each other with a crosslinker such that the water-soluble organic polymer is no longer water-soluble; and wherein the crosslinker is selected from the group consisting of sodium borate, boric acid, organic dialdehyde, or a combination of any two or more thereof.

22. A method of making the aerogel of claim 1, the method comprising:
   combining a water-soluble organic polymer, cellulose nanofibrils and/or nanocrystals, and a water-soluble graphene oxide in water;
   cross-linking the water-soluble organic polymer and the cellulose nanofibrils and/or nanocrystals to each other, such that the water-soluble organic polymer is no longer water-soluble; and
   removing the water from the resulting gel to form the aerogel.

23. The method of claim 22, wherein the water-soluble polymer is polyvinyl alcohol or polymerized resorcinol-formaldehyde.

24. The method of claim 22, wherein the water is removed by freeze-drying the gel to form the aerogel.

25. The method of claim 22, wherein the aerogel comprises water-soluble graphene oxide, further comprising contacting a surface of the aerogel with a surface modifying agent to provide a surface-modified aerogel.

* * * * *